United States Patent [19]
Sawashima et al.

[11] Patent Number: 6,008,609
[45] Date of Patent: Dec. 28, 1999

[54] NUMERICAL CONTROL APPARATUS AND METHOD OF CONTROLLING ACCELERATION/DECELERATION OF SPINDLE MOTOR OF NUMERICAL CONTROL APPARATUS

[75] Inventors: Kenji Sawashima; Minoru Andou, both of Tokyo, Japan

[73] Assignee: Mitsubishi Denki Kabushiki Kaisha, Tokyo, Japan

[21] Appl. No.: 08/759,891

[22] Filed: Dec. 3, 1996

[30] Foreign Application Priority Data

Sep. 2, 1996 [JP] Japan .................................... 8-231798

[51] Int. Cl.⁶ ........................... G05B 19/23; G05B 19/18
[52] U.S. Cl. ......................... 318/570; 318/571; 318/573; 318/569; 364/474.3; 364/474.31
[58] Field of Search ..................................... 318/270, 271, 318/560–696; 364/474.02, 474.3, 474.15, 474.31; 395/900, 61, 3

[56] References Cited

U.S. PATENT DOCUMENTS

| | | |
|---|---|---|
| 4,941,104 | 7/1990 | Teshima et al. . |
| 5,132,912 | 7/1992 | Ito et al. ............................. 364/474.02 |
| 5,307,549 | 5/1994 | Tsutsumi et al. ....................... 318/571 |
| 5,309,074 | 5/1994 | Mizukami ............................. 318/571 |
| 5,485,065 | 1/1996 | Kaneko et al. ......................... 318/270 |
| 5,493,502 | 2/1996 | Niwa .................................... 364/474.3 |
| 5,532,932 | 7/1996 | Niwa .................................... 364/474.3 |
| 5,598,512 | 1/1997 | Niwa ......................................... 395/61 |

FOREIGN PATENT DOCUMENTS

| | | |
|---|---|---|
| 0421176 | 4/1991 | European Pat. Off. . |
| 63-89904 | 4/1988 | Japan . |
| 3-117514 | 5/1991 | Japan . |

*Primary Examiner*—Paul Ip
*Attorney, Agent, or Firm*—Sughrue, Mion, Zinn, Macpeak & Seas, PLLC

[57] ABSTRACT

A spindle acceleration/deceleration controlling method in a numerical control unit comprising a spindle control section for controlling a spindle motor and a servo axis controlling section for controlling a servo axis motor, and for synchronously controlling the spindle and servo axis; wherein a spindle motor in the position loop control state is controlled with an acceleration/deceleration pattern similar to that of the spindle motor in the velocity loop control state.

19 Claims, 30 Drawing Sheets

FIG. 3

SPINDLE ACCELERATION/DECELERATION PATTERN DATA

| T1 | TIME CONSTANT FOR FIRST STAGE |
|---|---|
| SPD1 | SPINDLE ROTATIONAL SPEED FOR FIRST STAGE |
| T2 | TIME CONSTANT FOR SECOND STAGE |
| SPD2 | SPINDLET ROTATIONAL SPEED FOR SECOND STAGE |
| T3 | TIME CONSTANT FOR THIRD STAGE |
| SPD3 | SPINDLE ROTATIONAL SPEED FOR THIRD STAGE |
| T4 | TIME CONSTANT FOR FOURTH STAGE |
| SPD4 | SPINDLE ROTATIONAL SPEED FOR FOURTH STAGE |

FIG. 10

| | |
|---|---|
| TIME CONSTANT FOR FIRST STAGE | T11 |
| SPINDLE ROTATIONAL SPEED FOR FIRST STAGE | SPD11 |
| TIME CONSTANT FOR SECOND STAGE | T12 |
| SPINDLE ROTATIONAL SPEED FOR SECOND STAGE | SPD12 |
| TIME CONSTANT FOR THIRD STAGE | T13 |
| SPINDLE ROTATIONAL SPEED FOR THIRD STAGE | SPD13 |

} DATA FOR SPINDLE ACCELERATION/ DECELERATION PATTERN NO. 1

| | |
|---|---|
| TIME CONSTANT FOR FIRST STAGE | T21 |
| SPINDLE ROTATIONAL SPEED FOR FIRST STAGE | SPD21 |
| TIME CONSTANT FOR SECOND STAGE | T22 |
| SPINDLE ROTATIONAL SPEED FOR SECOND STAGE | SPD22 |
| TIME CONSTANT FOR THIRD STAGE | T23 |
| SPINDLE ROTATIONAL SPEED FOR THIRD STAGE | SPD23 |

} DATA FOR SPINDLE ACCELERATION/ DECELERATION PATTERN NO. 2

| | |
|---|---|
| TIME CONSTANT FOR FIRST STAGE | T31 |
| SPINDLE ROTATIONAL SPEED FOR FIRST STAGE | SPD31 |
| TIME CONSTANT FOR SECOND STAGE | T32 |
| SPINDLE ROTATIONAL SPEED FOR SECOND STAGE | SPD32 |
| TIME CONSTANT FOR THIRD STAGE | T33 |
| SPINDLE ROTATIONAL SPEED FOR THIRD STAGE | SPD33 |
| TIME CONSTANT FOR FOURTH STAGE | T34 |
| SPINDLE ROTATIONAL SPEED FOR FOURTH STAGE | SPD34 |

} DATA FOR SPINDLE ACCELERATION/ DECELERATION PATTERN NO. 3

| | |
|---|---|
| TIME CONSTANT FOR FIRST STAGE | T41 |
| SPINDLE ROTATIONAL SPEED FOR FIRST STAGE | SPD41 |
| TIME CONSTANT FOR SECOND STAGE | T42 |
| SPINDLE ROTATIONAL SPEED FOR SECOND STAGE | SPD42 |
| TIME CONSTANT FOR THIRD STAGE | T43 |
| SPINDLE ROTATIONAL SPEED FOR THIRD STAGE | SPD43 |
| TIME CONSTANT FOR FOURTH STAGE | T44 |
| SPINDLE ROTATIONAL SPEED FOR FOURTH STAGE | SPD44 |

} DATA FOR SPINDLE ACCELERATION/ DECELERATION PATTERN NO. 4

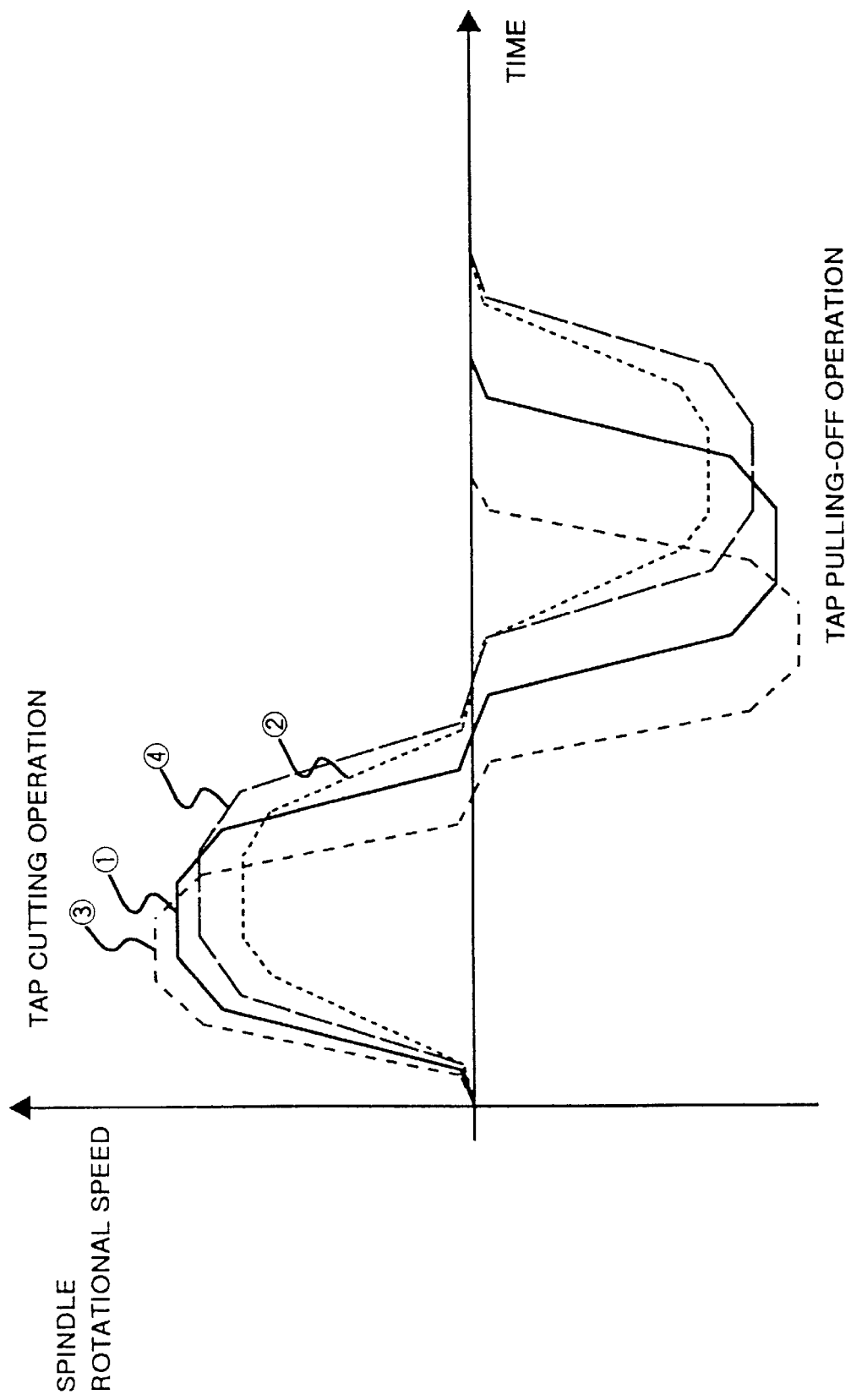

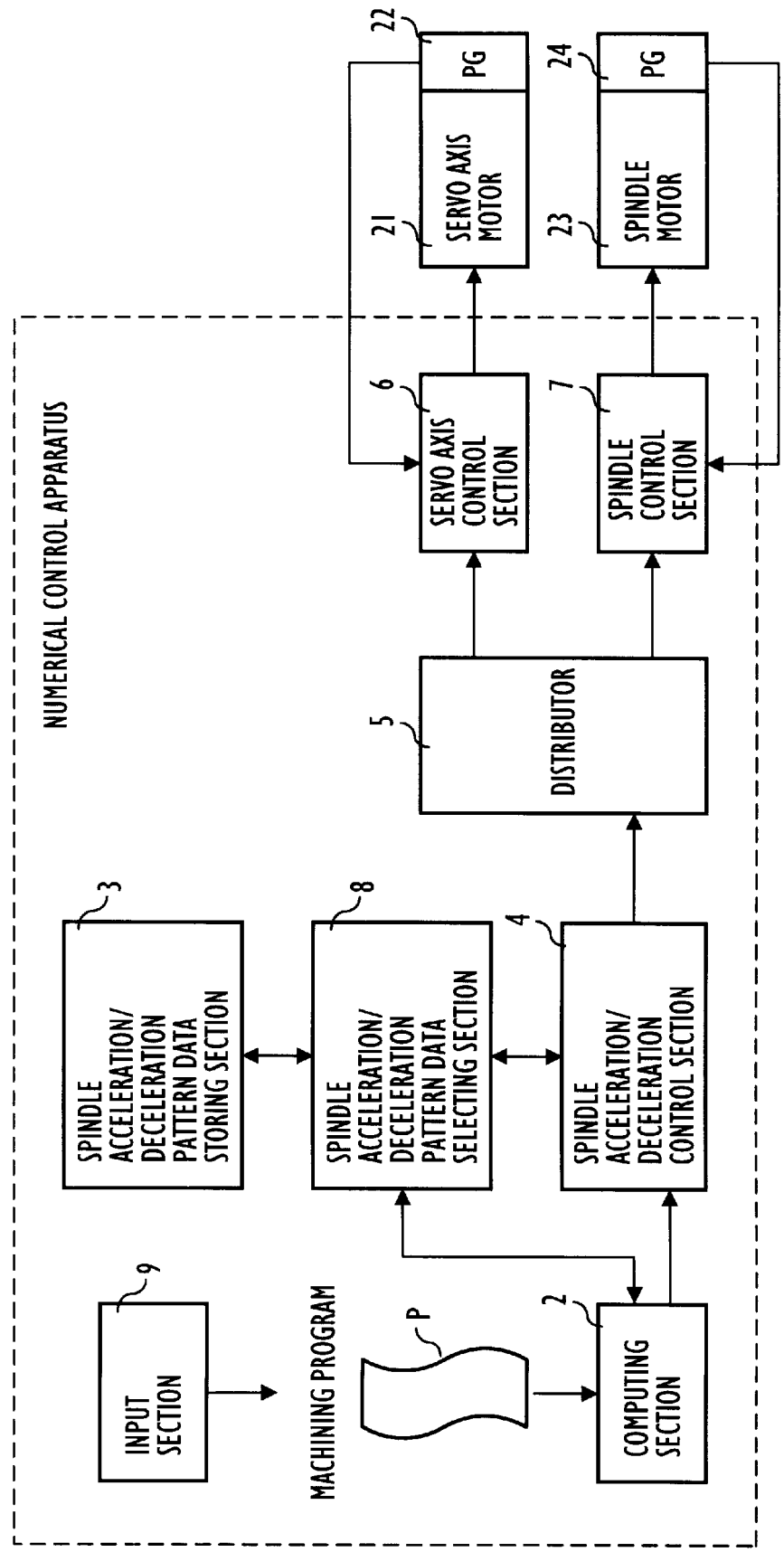

FIG. 14

| | |
|---|---|
| TIME CONSTANT FOR FIRST STAGE | T11 |
| SPINDLE ROTATIONAL SPEED FOR FIRST STAGE | SPD11 |
| TIME CONSTANT FOR SECOND STAGE | T12 |
| SPINDLE ROTATIONAL SPEED FOR SECOND STAGE | SPD12 |
| TIME CONSTANT FOR THIRD STAGE | T13 |
| SPINDLE ROTATIONAL SPEED FOR THIRD STAGE | SPD13 |

⎬ DATA FOR SPINDLE ACCELERATION/DECELERATION PATTERN NO. 1

| | |
|---|---|
| TIME CONSTANT FOR FIRST STAGE | T21 |
| SPINDLE ROTATIONAL SPEED FOR FIRST STAGE | SPD21 |
| TIME CONSTANT FOR SECOND STAGE | T22 |
| SPINDLE ROTATIONAL SPEED FOR SECOND STAGE | SPD22 |
| TIME CONSTANT FOR THIRD STAGE | T23 |
| SPINDLE ROTATIONAL SPEED FOR THIRD STAGE | SPD23 |
| TIME CONSTANT FOR FOURTH STAGE | T24 |
| SPINDLE ROTATIONAL SPEED FOR FOURTH STAGE | SPD24 |

⎬ DATA FOR SPINDLE ACCELERATION/DECELERATION PATTERN NO. 2

| | |
|---|---|
| TIME CONSTANT FOR FIRST STAGE | T31 |
| SPINDLE ROTATIONAL SPEED FOR FIRST STAGE | SPD31 |
| TIME CONSTANT FOR SECOND STAGE | T32 |
| SPINDLE ROTATIONAL SPEED FOR SECOND STAGE | SPD32 |
| TIME CONSTANT FOR THIRD STAGE | T33 |
| SPINDLE ROTATIONAL SPEED FOR THIRD STAGE | SPD33 |
| TIME CONSTANT FOR FOURTH STAGE | T34 |
| SPINDLE ROTATIONAL SPEED FOR FOURTH STAGE | SPD34 |

⎬ DATA FOR SPINDLE ACCELERATION/DECELERATION PATTERN NO. 3

| | |
|---|---|
| TIME CONSTANT FOR FIRST STAGE | T41 |
| SPINDLE ROTATIONAL SPEED FOR FIRST STAGE | SPD41 |
| TIME CONSTANT FOR SECOND STAGE | T42 |
| SPINDLE ROTATIONAL SPEED FOR SECOND STAGE | SPD42 |
| TIME CONSTANT FOR THIRD STAGE | T43 |
| SPINDLE ROTATIONAL SPEED FOR THIRD STAGE | SPD43 |
| TIME CONSTANT FOR FOURTH STAGE | T44 |
| SPINDLE ROTATIONAL SPEED FOR FOURTH STAGE | SPD44 |
| TIME CONSTANT FOR FIFTH STAGE | T45 |
| SPINDLE ROTATIONAL SPEED FOR FIFTH STAGE | SPD45 |

⎬ DATA FOR SPINDLE ACCELERATION/DECELERATION PATTERN NO. 4

| | |
|---|---|
| TIME CONSTANT FOR FIRST STAGE | Ta11 |
| SPINDLE ROTATIONAL SPEED FOR FIRST STAGE | SPDa11 |
| TIME CONSTANT FOR SECOND STAGE | Ta12 |
| SPINDLE ROTATIONAL SPEED FOR SECOND STAGE | SPDa12 |
| TIME CONSTANT FOR THIRD STAGE | Ta13 |
| SPINDLE ROTATIONAL SPEED FOR THIRD STAGE | SPDa13 |
| TIME CONSTANT FOR FOURTH STAGE | Ta14 |
| SPINDLE ROTATIONAL SPEED FOR FOURTH STAGE | SPDa14 |

⎫ DATA FOR SPINDLE ACCELERATION PATTERN NO. 1

| | |
|---|---|
| TIME CONSTANT FOR FIRST STAGE | Td11 |
| SPINDLE ROTATIONAL SPEED FOR FIRST STAGE | SPDd11 |
| TIME CONSTANT FOR SECOND STAGE | Td12 |
| SPINDLE ROTATIONAL SPEED FOR SECOND STAGE | SPDd12 |
| TIME CONSTANT FOR THIRD STAGE | Td13 |
| SPINDLE ROTATIONAL SPEED FOR THIRD STAGE | SPDd13 |

⎫ DATA FOR SPINDLE DECELERATION PATTERN NO. 1

| | |
|---|---|
| TIME CONSTANT FOR FIRST STAGE | Ta21 |
| SPINDLE ROTATIONAL SPEED FOR FIRST STAGE | SPDa21 |
| TIME CONSTANT FOR SECOND STAGE | Ta22 |
| SPINDLE ROTATIONAL SPEED FOR SECOND STAGE | SPDa22 |
| TIME CONSTANT FOR THIRD STAGE | Ta23 |
| SPINDLE ROTATIONAL SPEED FOR THIRD STAGE | SPDa23 |
| TIME CONSTANT FOR FOURTH STAGE | Ta24 |
| SPINDLE ROTATIONAL SPEED FOR FOURTH STAGE | SPDa24 |

⎫ DATA FOR SPINDLE ACCELERATION PATTERN NO. 2

| | |
|---|---|
| TIME CONSTANT FOR FIRST STAGE | Td21 |
| SPINDLE ROTATIONAL SPEED FOR FIRST STAGE | SPDd21 |
| TIME CONSTANT FOR SECOND STAGE | Td22 |
| SPINDLE ROTATIONAL SPEED FOR SECOND STAGE | SPDd22 |
| TIME CONSTANT FOR THIRD STAGE | Td23 |
| SPINDLE ROTATIONAL SPEED FOR THIRD STAGE | SPDd23 |

⎫ DATA FOR SPINDLE DECELERATION PATTERN NO. 2

FIG. 24

| | |
|---|---|
| ACCELERATION TIME CONSTANT FOR FIRST STAGE | Ta1 |
| SPINDLE ROTATIONAL SPEED FOR FIRST STAGE | SPDa1 |
| ACCELERATION TIME CONSTANT FOR SECOND STAGE | Ta2 |
| SPINDLE ROTATIONAL SPEED FOR SECOND STAGE | SPDa2 |
| ACCELERATION TIME CONSTANT FOR THIRD STAGE | Ta3 |
| SPINDLE ROTATIONAL SPEED FOR THIRD STAGE | SPDa3 |
| ACCELERATION TIME CONSTANT FOR FOURTH STAGE | Ta4 |
| SPINDLE ROTATIONAL SPEED FOR FOURTH STAGE | SPDa4 |
| DECELERATION TIME CONSTANT FOR FIRST STAGE | Td1 |
| SPINDLE ROTATIONAL SPEED FOR FIRST STAGE | SPDd1 |
| DECELERATION TIME CONSTANT FOR SECOND STAGE | Td2 |
| SPINDLE ROTATIONAL SPEED FOR SECOND STAGE | SPDd2 |
| DECELERATION TIME CONSTANT FOR THIRD STAGE | Td3 |
| SPINDLE ROTATIONAL SPEED FOR THIRD STAGE | SPDd3 |
| DECELERATION TIME CONSTANT FOR FOURTH STAGE | Td4 |
| SPINDLE ROTATIONAL SPEED FOR FOURTH STAGE | SPDd4 |

Rows 1–8: ACCELERATION PATTERN DATA
Rows 9–16: DECELERATION PATTERN DATA

NUMERICAL CONTROL APPARATUS AND METHOD OF CONTROLLING ACCELERATION/DECELERATION OF SPINDLE MOTOR OF NUMERICAL CONTROL APPARATUS

FIELD OF THE INVENTION

The present invention relates to a numerical control apparatus as well as to a method of controlling acceleration and deceleration of a spindle motor of the numerical control apparatus, and more particularly to a numerical control apparatus and a method of controlling acceleration deceleration of a spindle motor of the numerical control apparatus which can control synchronism between a servo axis and a spindle for tapping or the like in a machine tool such as a machining center.

BACKGROUND OF THE INVENTION

The technology for controlling synchronism between a spindle and a servo axis (a shaft along a longitudinal axis line of the spindle) for tapping with a machining center or the like is well known, and this technology is disclosed for instance in Japanese Patent Laid-Open Publication No. HEI 63-89904.

FIG. 28 shows configuration of a numerical control apparatus disclosed in Japanese Patent Laid-Open Publication No. HEI 63-89904. A numerical control apparatus 600 comprises a central processing unit (described as CPU hereinafter) 601 for analyzing a machining program P, and a servo axis computing section 602, and has a servo axis driving section 603 for controlling movement along the vertical axis (Z shaft) for tapping, a spindle computing section 604, and a spindle driving section 605 for controlling rotation of a spindle 700 for tapping.

The spindle 700 is provided in a machine tool such as a machining center and is rotated and driven by a spindle motor 701 which is controlled by the spindle driving section 605. Attached to a tip of the spindle 700 is a tapping tool T without a float mechanism.

A feed screw mechanism 702 is connected to the spindle 700, and the spindle 700 moves along the axial direction (in the direction along the Z shaft) due to rotation of the feed screw 703. The feed screw 703 is rotated and driven by a servo axis motor 704 controlled by the servo axis driving section 603.

A work W to be tapped is placed on a work table 705.

It should be noted that the servo axis computing section 602 and the spindle computing section 604 are synchronized to each other according to a synchronous signal Ssy.

When the CPU 601 interprets an instruction for tapping from a machining program P, it makes a gain and a time constant for a servo axis control system identical to a gain and a time constant for a spindle control system according to a gain and a time constant for the servo axis control system previously set, computing data for rotation of the spindle and data for movement of the servo axis, outputs the data for rotation of the spindle to the spindle computing section 604, outputs data for movement of the servo axis to the servo axis computing section 602, controls interpolation for the spindle (C shaft) and the servo axis (Z shaft) according to the data for rotation of the spindle and data for movement of the servo axis, and transfers the interpolation data to the spindle computing section 604 and to the servo axis computing section 602.

The spindle computing section 604 computes an instruction for acceleration/deceleration of the spindle motor according to the data for rotation of the spindle given from the CPU 601, and outputs the instruction for acceleration/deceleration to the spindle driving section 605. With this operation, the spindle motor 701 starts rotation, and a tapping tool T of the spindle 700 rotates.

The servo axis computing section 602 computes an instruction for acceleration/deceleration of the servo axis motor 704 according to the same instruction for acceleration/deceleration of the spindle motor 701 and the data for movement of the servo axis given from the CPU 601, and outputs the instruction to the servo axis driving section 603 in synchronism to the spindle control system. With this operation, the servo axis motor 704 starts rotation, and the tapping tool T of the spindle 700 goes down due to rotation of the feed screw 703. Then the tapping tool T goes into a lower hole h of the work W and executes tap cutting operation to make a female screw on an internal surface of the lower hole.

When tapping has been executed by a specified length, the spindle computing section 604 outputs an instruction for acceleration/deceleration of the spindle motor 701 to the spindle driving section 605, and makes the spindle motor rotate in the reverse direction to make the tapping tool T rotate in the reverse direction. In synchronism to this operation, the servo axis computing section 602 outputs an instruction for acceleration/deceleration of the servo axis motor 704 to the servo axis driving section 603, and makes the servo axis motor 704 rotate in the reverse direction to move the tapping tool T upward. With this operation, the tapping tool T is pulled off from the work W.

In the tapping operation as described above, to make shorter the cycle time, a rotational speed of the spindle motor 701 should reach a specified high rotational speed within a short period of time. Namely a slope of acceleration/deceleration (acceleration) during the tapping operation should be make larger.

However, in a numerical control apparatus based on the conventional technology, a slope of acceleration/deceleration is constant, and acceleration or deceleration is executed with a linear acceleration/deceleration pattern, and if a slope of acceleration or deceleration in tapping is made larger, as inertia in the spindle system becomes larger as compared to that in the servo axis system, a follow-up delay of the spindle motor from the servo axis motor may easily occur at a point of time just before start of acceleration from the stopped or just before end of acceleration (for just before start of constant speed rotation), or at a point of time just before start of deceleration from constant speed rotation or just before end of deceleration (start of stopped state), which makes it difficult to maintain the synchronized state. For this reason, a positional error between the spindle motor and the servo axis motor becomes larger with thread of tap crushed, and a rotational speed of a spindle motor cannot substantially be raised within a short period of time in tapping.

Also in a numerical control apparatus based on the conventional technology, a rotational speed during an tap pulling-off operation can be made higher for an efficient tapping operation as compared to that during a tap cutting operation, but if a rotational speed of the spindle motor is made faster within a short period of time, a positional error between the spindle motor and the servo axis motor becomes larger, so that a speed of a tap pulling-off operation can not substantially be made faster.

Also in a numerical control apparatus based on the conventional technology, though inertia of a spindle during an operating for accelerating a spindle motor is different from inertia of the spindle during an operation for decelerating the spindle motor, the acceleration pattern is the same as the deceleration pattern, so that either one of the accelerating operation or the decelerating operation is controlled with an acceleration pattern or a deceleration pattern which is not optimal, which disadvantageously causes a loss time in a cycle time.

SUMMARY OF THE INVENTION

It is an object of the present invention to provide a numerical control apparatus and a method of controlling acceleration/deceleration of a spindle motor of the numerical control apparatus in which a positional error between a spindle motor and a servo axis motor does not become larger even if the spindle motor is accelerated or decelerated rapidly, and a speed of a tap pulling-off operation can be made faster as compared to a speed of tap cutting operation, and which can control both acceleration and deceleration with an appropriate acceleration pattern or an appropriate deceleration pattern even in a case where inertia of the spindle during acceleration of a spindle motor is different from that during deceleration of the spindle motor for control of synchronism between the servo axis and the spindle in tapping or a similar operation.

In the numerical control apparatus according to the present invention, the spindle acceleration/deceleration control means computes instructions for controlling a spindle motor in the position loop control state with acceleration/deceleration patterns similar to acceleration/deceleration patterns for a spindle motor in the velocity loop control state according to the acceleration/deceleration pattern data stored in the spindle acceleration/deceleration pattern data storing means, and a spindle motor in the position loop control state controlled with acceleration/deceleration patterns similar to acceleration/deceleration patterns for a spindle motor in the velocity loop control state, so that response capability of a spindle motor is improved, and even in a case where inertia in the spindle becomes larger as compared to that in the servo axis, a follow-up delay of the spindle motor from the servo axis motor does not easily occur at a point of time just before start of acceleration from the stopped state or just before end of acceleration (for just before start of constant speed rotation), or at a point of time just before start of deceleration from constant speed rotation or just before end of deceleration (start of stopped state).

In the numerical control apparatus according to the invention described above, the spindle acceleration/deceleration pattern data storing means stores a plurality types of the spindle acceleration/deceleration pattern data for controlling a spindle motor in the position loop control state with acceleration/deceleration patterns similar to acceleration/deceleration patterns for the spindle motor in the velocity loop control state, and the spindle acceleration/deceleration pattern data storing means and spindle acceleration/deceleration pattern data selecting means select acceleration/deceleration patterns similar to acceleration/deceleration patterns for the spindle motor in the velocity loop control state suitable for a material of a work, a material of a tool, and a form thereof, and a spindle motor in the position loop control state is controlled according to the selected spindle acceleration/deceleration pattern data, whereby response capability of the spindle motor is precisely improved.

In the numerical control apparatus according to the invention described above, the spindle acceleration/deceleration pattern data selecting means sets for selection of acceleration/deceleration patterns similar to acceleration/deceleration patterns for the spindle motor in different velocity loop control states each suitable for tap cutting operations as well as for tap pulling-off operations respectively, and the spindle motor in the position loop control state is controlled according to the selected and set spindle acceleration/deceleration pattern data, so that response capability of the spindle motor is improved in an optimal state during the tap cutting operations as well as during the tap pulling-off operations respectively.

In the numerical control apparatus according to the invention described above, the spindle acceleration/deceleration pattern data is set for selection by means of analyzing data described in a machining program.

In the numerical control apparatus according to the invention described above, acceleration/deceleration patterns similar to acceleration/deceleration patterns for the spindle motor in the different velocity loop control states each suitable for acceleration as well as for deceleration are set, and the spindle motor in the position loop control state is controlled according to the set spindle acceleration pattern data as well as to the set spindle deceleration pattern data, so that response capability of the spindle motor is improved in an optimal state in acceleration as well as in deceleration respectively.

In the numerical control apparatus according to the invention described above, a spindle motor in the velocity loop control state is rotated and driven from the stopped state and the spindle motor in the velocity loop control state is stopped from the constant speed rotation state, whereby the spindle acceleration data and spindle deceleration data on the operations described above are stored in the spindle acceleration/deceleration data storing means, and the spindle acceleration/deceleration data analyzing means analyzes the acceleration data and deceleration data stored in the spindle acceleration/deceleration data storing means, and computes spindle acceleration pattern data and spindle deceleration pattern data for controlling a spindle motor in the position loop control state with acceleration pattern or deceleration pattern similar to acceleration or deceleration patterns for the spindle motor in the velocity loop control state, so that the spindle acceleration/deceleration patterns data is automatically set in the spindle acceleration/deceleration pattern data storing section.

In the numerical control apparatus according to the invention described above, the acceleration/deceleration pattern data or the acceleration pattern data and the deceleration pattern data for a spindle motor comprise a time constant and a rotational speed of the spindle in each of a plurality of stages of an acceleration process as well as of a deceleration process.

In the method of controlling acceleration/deceleration of a spindle motor of a numerical control apparatus according to the invention described above, the spindle motor in the position loop control state is controlled with acceleration/deceleration patterns similar to acceleration/deceleration patterns of the spindle motor in the velocity loop control state, whereby response capability of a spindle motor is improved, and even in a case where inertia in the spindle becomes larger as compared to that in the servo axis, a follow-up delay of the spindle motor from the servo axis motor does not easily occur at a point of time just before start of acceleration from the stopped state or just before end of acceleration (for just before start of constant speed rotation), or at a point of time just before start of deceleration from constant speed rotation or just before end of deceleration (start of stopped state).

In the method of controlling acceleration/deceleration of a spindle motor of a numerical control apparatus according to the invention described above, instructions for controlling a spindle motor in the position loop control state with acceleration/deceleration patterns similar to acceleration/deceleration patterns of the spindle motor in the velocity loop control state are computed with the spindle acceleration/deceleration control means according to the acceleration/deceleration pattern data stored in the spindle acceleration/deceleration pattern data storing means, and instructions outputted from the spindle acceleration/deceleration control means are distributed with the distributing means so that the synchronism between the spindle control section and the servo axis control section is maintained, and the spindle motor in the position loop control state is controlled with acceleration/deceleration patterns similar to acceleration/deceleration patterns of the spindle motor in the velocity loop control state, whereby response capability of a spindle motor is improved, and even in a case where inertia in the spindle becomes larger as compared to that in the servo axis, a follow-up delay of the spindle motor from the servo axis motor does not easily occur at a point of time just before start of acceleration from the stopped state or just before end of acceleration (for just before start of constant speed rotation), or at a point of time just before start of deceleration from constant speed rotation or just before end of deceleration (start of stopped state).

In the method of controlling acceleration and deceleration of a spindle motor of a numerical control apparatus according to the invention described above, acceleration/deceleration patterns similar to acceleration/deceleration patterns for the spindle motor in the velocity loop control state suitable for a material of a work, a material of a tool, and a form thereof can be selected, and the spindle motor in the position loop control state is controlled according to the selected spindle acceleration/deceleration pattern data, whereby response capability of the spindle motor is precisely improved.

In the method of controlling acceleration/deceleration of a spindle motor of a numerical control apparatus according to the invention described above, the selection of spindle acceleration/deceleration pattern data is instructed by describing a machining program.

In the method of controlling acceleration/deceleration of a spindle motor of a numerical control apparatus according to the invention described above, acceleration/deceleration patterns similar to acceleration/deceleration patterns for the spindle motor in the different velocity loop control states each suitable for tap cutting operations as well as for tap pulling-off operations respectively are set for selection, and the spindle motor in the position loop control state is controlled according to the selected and set spindle acceleration/deceleration pattern data, so that response capability of the spindle motor is improved in an optimal state during the tap cutting operations as well as during the tap pulling-off operations respectively.

In the method of controlling acceleration/deceleration of a spindle motor of a numerical control apparatus according to the invention described above, acceleration/deceleration patterns similar to acceleration/deceleration patterns for the spindle motor in the different velocity loop control states each suitable for acceleration as well as for deceleration respectively are set, and the spindle motor in the position loop control state is controlled according to the set spindle acceleration pattern data or spindle deceleration pattern data, so that response capability of the spindle motor is improved in an optimal state during the acceleration as well as during the deceleration, respectively.

In the method of controlling acceleration/deceleration of a spindle motor of a numerical control apparatus according to the invention described above, a spindle motor in the velocity loop control state is rotated and driven from the stopped state and the spindle motor in the velocity loop control state is stopped from the constant speed rotation state, whereby the spindle acceleration/deceleration pattern data is automatically set in the spindle acceleration/deceleration pattern data storing section.

In the method of controlling acceleration/deceleration of a spindle motor of a numerical control apparatus according to the invention described above, the acceleration/deceleration pattern data, or the acceleration pattern data and deceleration pattern data for a spindle motor comprise a time constant and a rotational speed of the spindle in each of a plurality stages of an acceleration process as well as of a deceleration process.

Other objects and features of this invention will become understood from the following description with reference to the accompanying drawings.

BRIEF DESCRIPTION OF THE DRAWINGS

FIG. 3 is an explanatory view showing an example of data contents of the spindle acceleration/deceleration pattern data storing section in Embodiment 1;

FIG. 10 is an explanatory view showing an example of data contents of the spindle acceleration/deceleration pattern data storing section in Embodiment 2;

FIG. 11 is a graph showing an example of an output instruction for tapping operation in Embodiment 2;

FIG. 13 is a block diagram showing key configuration of the numerical control apparatus according to Embodiment 3 of the present invention;

FIG. 14 is an explanatory view showing an example of data contents of the spindle acceleration/deceleration pattern data storing section in Embodiment 3;

FIG. 15 is an explanatory view showing an example of a tapping program in Embodiment 3;

FIG. 19 is an explanatory view showing an example of data contents of the spindle acceleration/deceleration pattern data storing section in Embodiment 4;

FIG. 24 is an explanatory view showing an example of data contents of the spindle acceleration/deceleration pattern data storing section in Embodiment 5;

DESCRIPTION OF THE PREFERRED EMBODIMENTS

Figure 1:
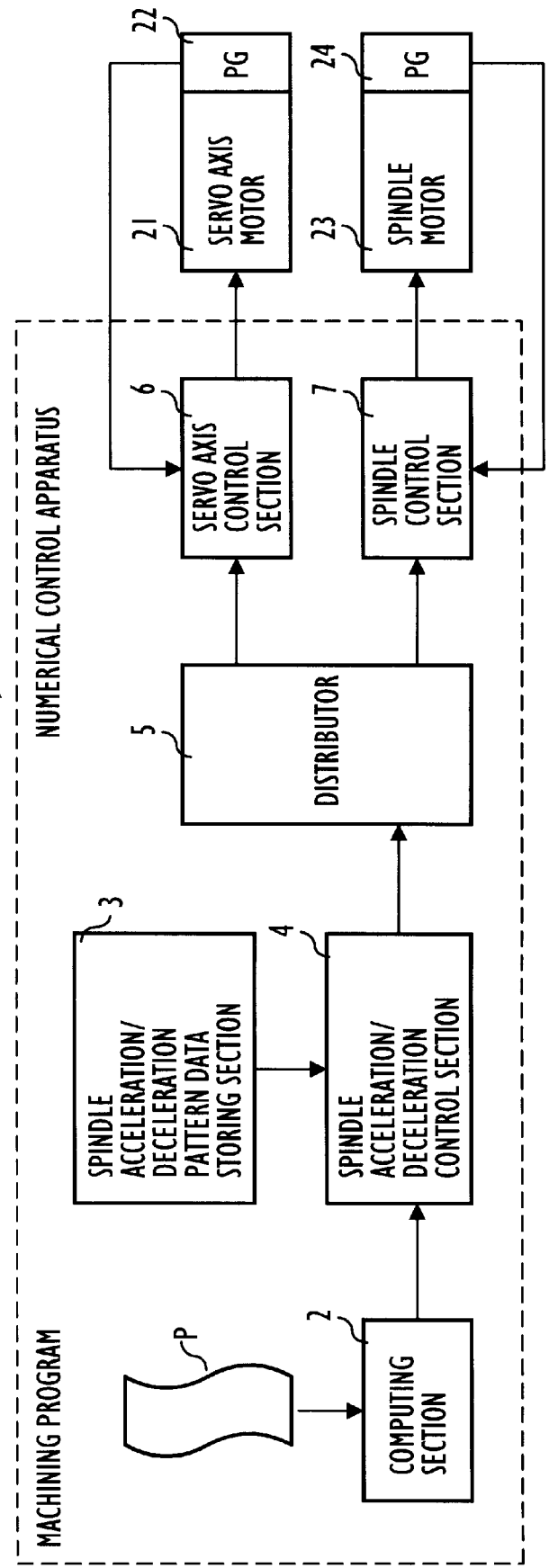
FIG. 1 is a block diagram showing key configuration of the numerical control apparatus according to Embodiment 1 of the present invention.

FIG. 1 shows a numerical control apparatus according to Embodiment 1 of the present invention.

This numerical control apparatus 1 has a computing section 2, a spindle acceleration/deceleration pattern data storing section 3, a spindle acceleration/deceleration control section 4, a distributor 5, a servo axis control section 6, and a spindle control section 7.

The computing section 2 is a program analyzing section and executes computing for shaft control according to machining instruction data read from a machining program p.

The spindle acceleration/deceleration pattern data storing section 3 stores therein data (data concerning acceleration/deceleration patterns) for controlling a spindle motor in the position loop control state with acceleration/deceleration patterns similar to those for the spindle motor in the velocity loop control state.

The spindle acceleration/deceleration control section 4 is given an instruction for shaft control from the computing section 2, and computes an instruction for controlling the spindle motor in the position loop control state with acceleration/deceleration patterns similar to those for the spindle motor 23 in the velocity loop control state.

The distributor 5 distributes instructions outputted from the spindle acceleration/deceleration control section 4 to the servo axis control section 6 and to the spindle control section 7 so that the synchronized state between them is maintained.

The servo axis control section 6 is a shaft control section for controlling a servo axis motor 21 for tapping, and controls the servo axis motor 21 in the position loop control state according to instructions given from the distributor 5 as well as to positional data outputted from a pulse encoder (PG) 22 of the servo axis motor 21.

The spindle control section 7 is a shaft control section for controlling the spindle motor 23 for tapping, and controls the spindle motor 23 in the position loop control state according to instructions given from the distributor 5 and positional data outputted from the pulse encoder (PG) 24 of the spindle motor 23.

Figure 2:
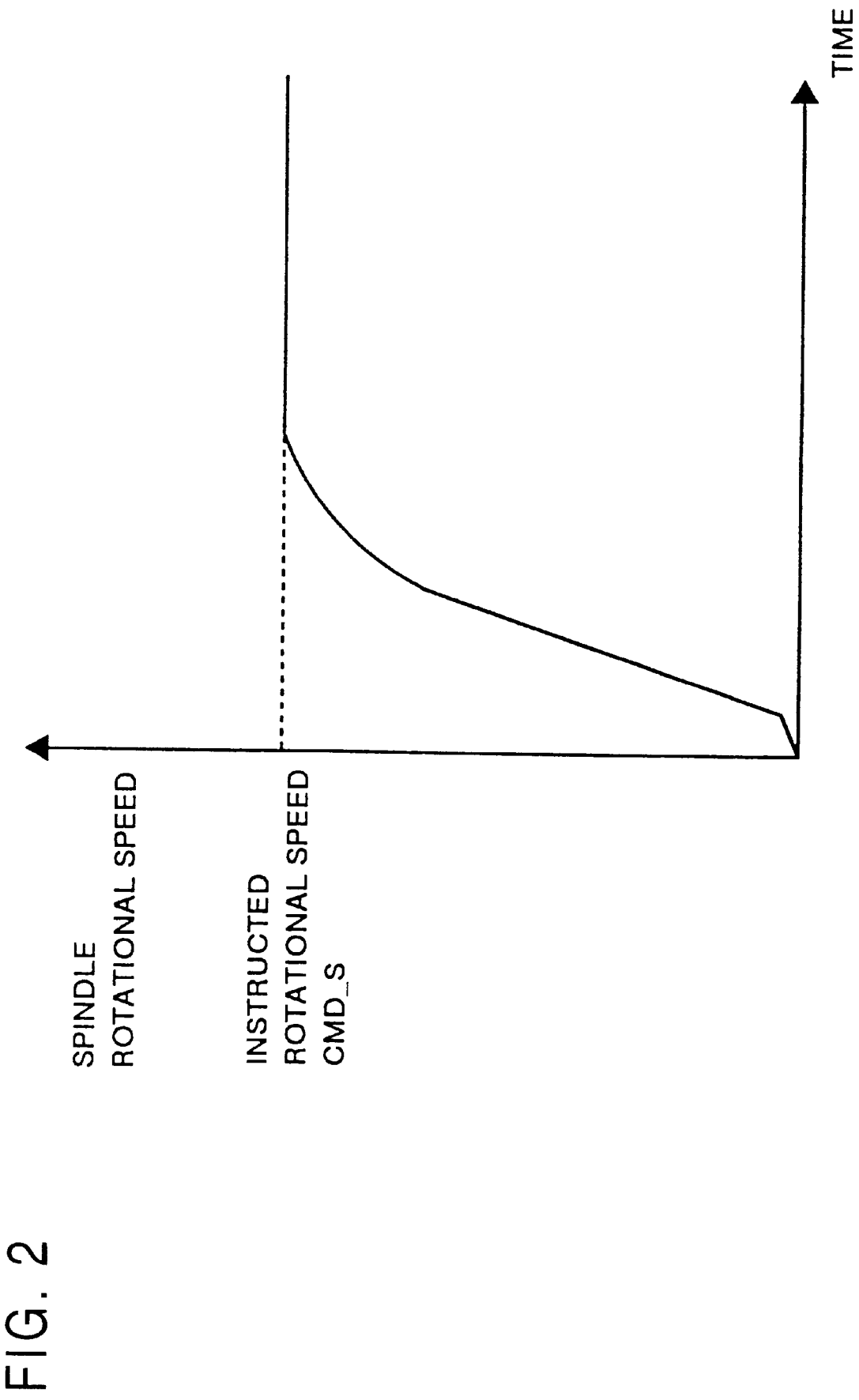
FIG. 2 is a graph for acceleration characteristics showing an example of an acceleration pattern in the velocity loop control state of a spindle motor.

FIG. 2 shows an example of acceleration/deceleration patterns of the spindle motor 23 in the velocity loop control state. During acceleration until up to a point of time when a rotational speed of the spindle 23 has reached the instructed rotational speed CMD_S, loose acceleration is executed when acceleration is started from the stopped state, and then acceleration is continued with a substantially constant slope, and when a rotational speed of the spindle motor 23 gets close to the instructed rotational speed CMD_S, loose acceleration is again executed, and when a rotational speed of the spindle motor 23 has reached the instructed rotational speed CND_S, rotation with a constant rotational speed is executed, and during deceleration, the sequence described above is executed in the reverse order.

Data for acceleration and deceleration with acceleration/deceleration patterns as described above is stored in the spindle acceleration/deceleration pattern data storing section 3 as shown in FIG. 3. In this example, acceleration/deceleration is executed in four stages, and a time constant T1 for the first stage and a rotational speed of a spindle in the first state SPD1 are data used for decision of a slope of acceleration/deceleration in the first stage; a time constant T2 for the second stage and a rotational speed of the spindle in the second stage SPD2 are data for decision of a slope of acceleration/deceleration in the second stage; a time constant T3 for the third stage and a rotational speed of the spindle in the third stage SPD3 are data used for decision of a slope of acceleration/deceleration in the third stage; and a time constant T4 for the fourth stage and a rotational speed of the spindle in the fourth stage SPD4 are data used for decision of a slope of acceleration/deceleration in the fourth stage.

Figure 4:
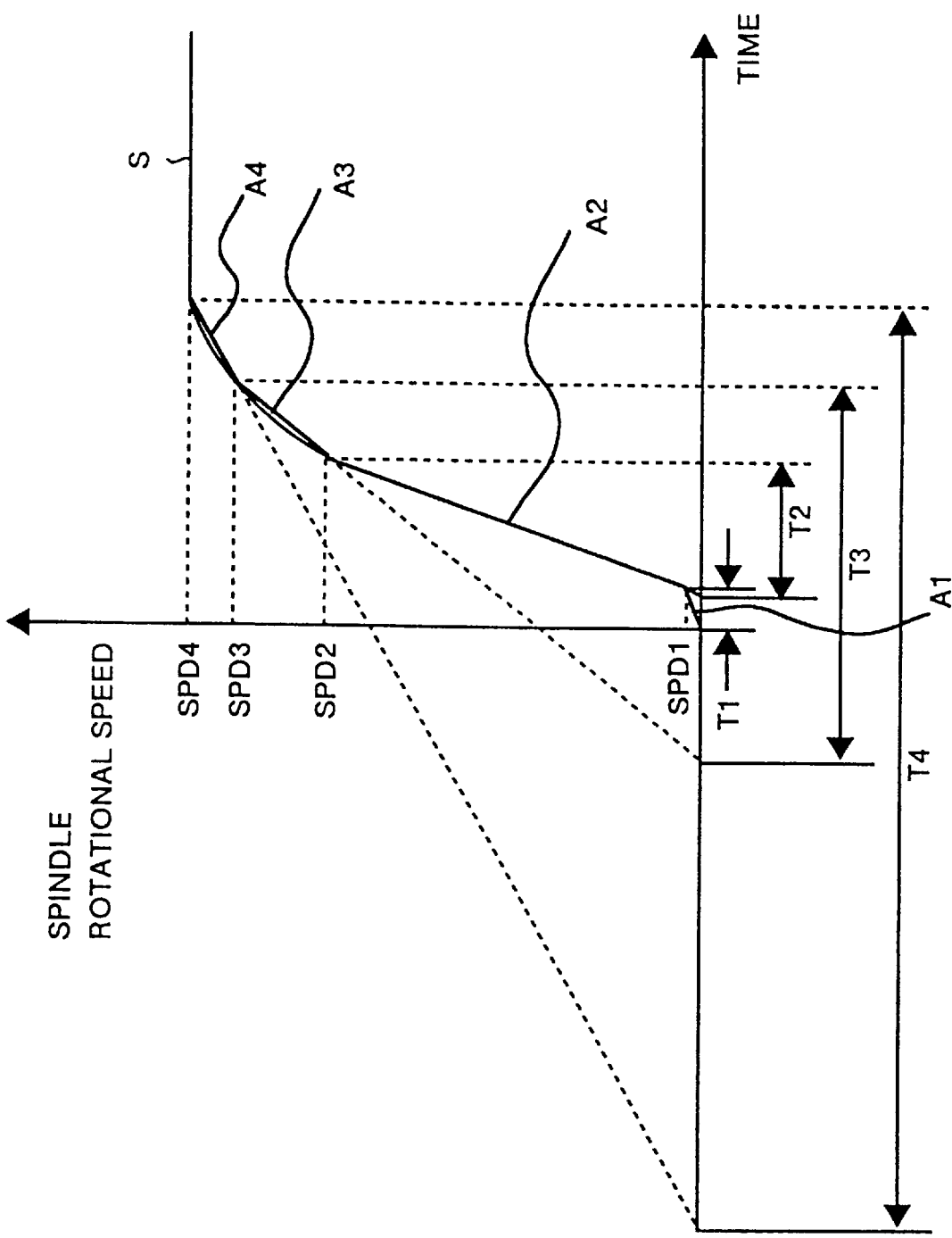
FIG. 4 is a graph showing an example of instruction for output from the spindle acceleration/deceleration control section during acceleration in Embodiment 1.

FIG. 4 is an example of outputted instructions for acceleration computed by the spindle acceleration/deceleration control section 4, and next description is made for the instruction for acceleration with reference to data stored in the spindle acceleration/deceleration pattern data storing section 3 shown in FIG. 3.

An acceleration output instruction A1 in the first stage is an instruction for acceleration output from a point of time when a rotational speed of the spindle 23 is 0 (stopped state) until a point of time when it reaches the spindle rotational speed SPD1 for the first stage, and is computed depending on the time constant T1 for the first stage and the spindle rotational speed SPD1 in the first stage each stored in the spindle acceleration/deceleration pattern data storing section 3.

An acceleration output instruction A2 for the second stage is an instruction for acceleration output from a point of time when a rotational speed of the spindle 23 is at the spindle rotational speed SPD1 in the first stage until a point of time when it reaches the spindle rotational speed SPD2 for the second stage, and is computed according to the time constant T2 for the second stage and the spindle rotational speed SPD2 for the second stage each stored in the spindle acceleration/deceleration pattern data storing section 3.

An acceleration output instruction A3 for the third stage is an instruction for acceleration output from a point of time when a rotational speed of the spindle motor 23 is at the spindle rotational speed SPD2 for the second stage until a point of time when it reaches the spindle rotational speed SPD3 for the third stage, and is computed according to the time constant T3 for this third stage and the spindle rotational speed SPD3 for the third stage each stored in the spindle acceleration/deceleration pattern data storing section 3.

An acceleration output instruction A4 for the fourth stage is an instruction for acceleration output from a point of time when a rotational speed of the spindle 23 is at the spindle rotational speed SPD3 for the third stage until a point of time when it reaches the spindle rotational speed SPD4 for the fourth stage each stored in the spindle acceleration/deceleration pattern data storing section 3.

An output instruction S for rotation at a constant speed is computed according to the spindle rotational speed SPD4 for the fourth speed.

As described above, an instruction for controlling the spindle 23 in the position loop control state with acceleration patterns similar to those of the spindle motor in the velocity loop control state as shown in FIG. 2, namely with acceleration patterns most suited to acceleration of the spindle motor 23 is prepared according to the acceleration output instructions A1, A2, A3, and A4 for the four stages and the output instruction S for rotation at a constant speed shown in FIG. 2.

Herein a case is shown where a rotational speed of the spindle instructed by the machining program P is equal to or more than the spindle rotational speed SPD4 for the fourth stage and an instruction value for movement of the servo axis for maintaining synchronism with the spindle is sufficient for the spindle motor 23 to reach the spindle rotational speed SPD4 for the fourth stage, but in a case where an instruction value for movement of the servo axis for maintaining synchronism with the spindle is not sufficient for the spindle 23 to reach the spindle rotational speed instructed by the machining program P and the spindle rotational speed SPD4 for the fourth state, the spindle is accelerated up to the allowable maximum spindle rotational speed, and then is decelerated.

Also in a case where an rotational speed of the spindle instructed by the machining program P is less than the spindle rotational speed SPD4 for the fourth stage and an instruction value for movement of the servo axis for maintaining synchronism with the spindle is sufficient for the spindle motor 23 to reach the spindle rotational speed instructed by the machining program P, the spindle motor 23 rotates at a constant speed when it reaches the spindle rotational speed instructed by the machining program P.

Figure 5:
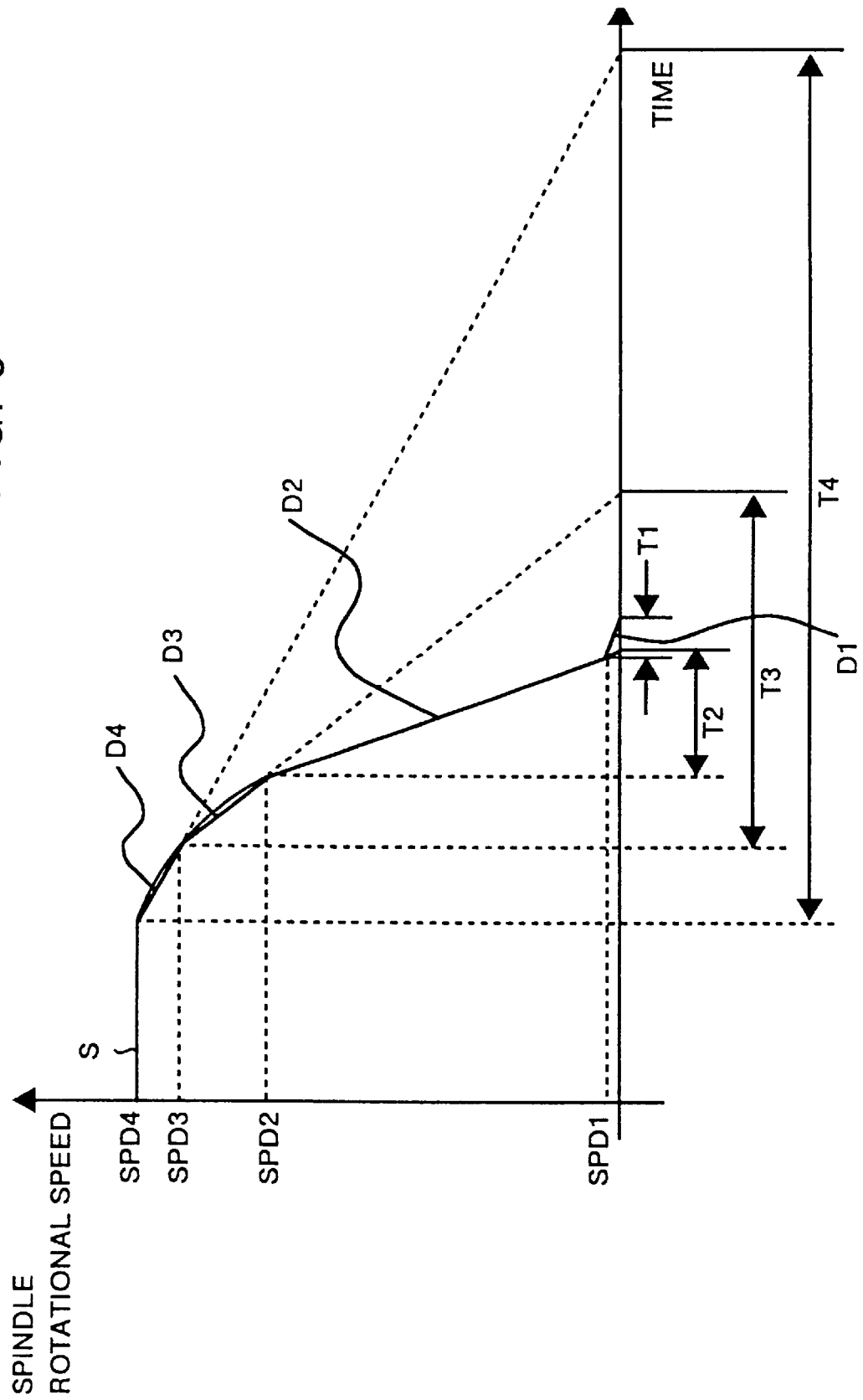
FIG. 5 is a graph showing an example of instruction for output from the spindle acceleration/deceleration control section during deceleration in Embodiment 1.

FIG. 5 is an example of output instructions for deceleration computed by the spindle acceleration/deceleration control section 4, and description is made for the example with reference to the data stored in the spindle acceleration/deceleration pattern data storing section 3.

The output instruction S for rotation at a constant speed is computed according to the spindle rotational speed SPD4 for the fourth stage like in a case of acceleration.

A deceleration output instruction D4 for the fourth stage is an instruction for deceleration output, after start of the deceleration processing, from a point of time when a rotational speed of the spindle motor 23 is at the spindle rotational speed SPD4 for the fourth stage until a point of time when it reaches the spindle rotational speed SPD3 for the third stage, and is computed according to the time constant T4 for the fourth stage and the spindle rotational speed SPD4 for the fourth stage each stored in the spindle acceleration/deceleration pattern data storing section 3.

A deceleration output instruction D3 for the third stage is an instruction for deceleration output from a point of time when a rotational speed of the spindle motor 23 is at the spindle rotational speed SPD3 for the third stage until a point of time when it reaches the spindle rotational speed SPD2 for the second stage, and is computed according to the time constant T3 for the third stage and the spindle rotational speed SPD3 for the third stage each stored in the spindle acceleration/deceleration pattern data storing section 3.

A deceleration output instruction D2 for the second stage is an instruction for deceleration output from a point of time when a rotational speed of the spindle motor 23 is at the spindle rotational speed SPD2 for the second stage until a point of time when it reaches the spindle rotational speed SPD1 for the first stage, and is computed according to the time constant T2 for the second stage and the spindle rotational speed SPD2 for the second stage each stored in the spindle acceleration/deceleration pattern data storing section 3.

A deceleration output instruction D1 for the first stage is an instruction for deceleration output from a point of time when a rotational speed of the spindle 23 is at the spindle rotational speed SPD1 for the first stage until a point of time when it reaches (stopped state), and is computed according to the time constant T1 for the first stage and the spindle rotational speed SPD1 for the first stage each stored in the spindle acceleration/deceleration pattern data storing section 3.

As described above, an instruction for controlling the spindle motor 23 in the position loop control state with deceleration patterns similar to those of the spindle motors in the spindle motor 23 in the velocity loop control state; namely deceleration patterns most suited for deceleration of the spindle motors 23 is prepared according to the output instruction S for a rotation at a constant speed as well as to the deceleration output instructions D1, D2, D3, D4 for the four stages.

Although the description above assumes a case where a rotational speed of the spindle motor 23 is decelerated from the spindle rotational speed SPD4 for the fourth stage, in a case where a rotational speed of the spindle motor 23 is decelerated from a rotational speed higher than the spindle rotational speed SPD3 for the third stage and less than the spindle rotational speed SPD4 for the fourth stage, an instruction for controlling the spindle motor 23 in the position loop control state with a deceleration pattern similar to that of the spindle motor 23 in the velocity loop control state, namely a deceleration patterns most suited to deceleration of the spindle motor 23 is prepared according to the deceleration output instruction D4 for the fourth stage, deceleration output instruction D3 for the third stage D3, deceleration output instruction D2 for the second stage, and deceleration output instruction D1 for the first stage; in a case where a rotational speed of the spindle motor 23 is decelerated from a rotational speed higher than the spindle rotational speed SPD2 for the second stage and less than the spindle rotational speed SPD3 for the third stage, according to the deceleration output instructions D3 for the third stage, deceleration output instruction D2 for the second stage, and deceleration output instruction D1 for the first stage; in a case where a rotational speed of the spindle motor 23 is decelerated from a rotational speed higher than the spindle rotational speed SPD1 for the first stage and less than the spindle rotational speed SPD2 for the second stage, according to the deceleration output instruction D2 for the second stage and the deceleration output instruction D1 for the first stage; and in a case where a rotational speed of the spindle motor 23 is decelerated from rotational speed less than the spindle rotational speed SPD1 for the first stage, according to the deceleration output instruction SPD1 for the first stage.

Figure 6:
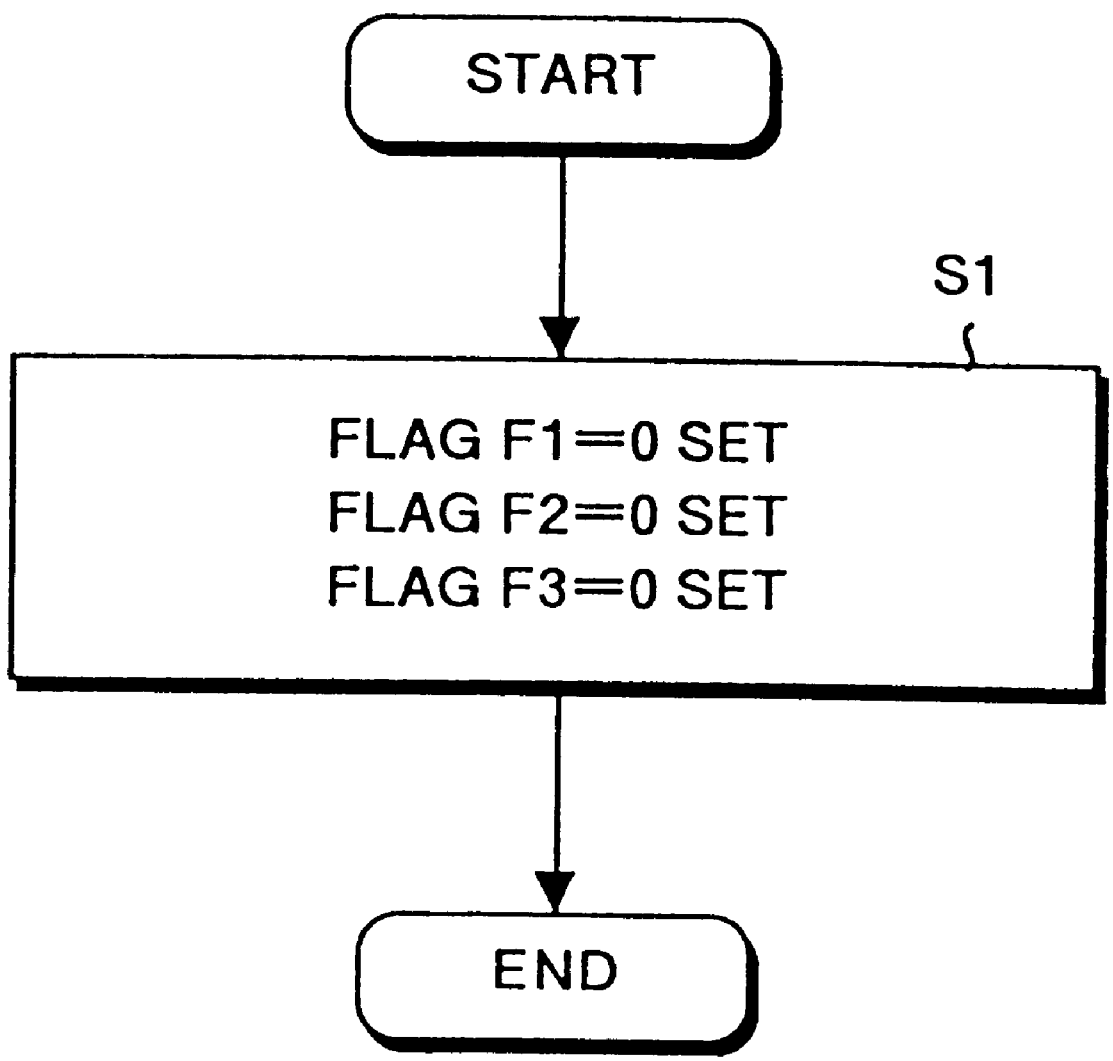
FIG. 6 is a flow chart showing initialization processing of tapping operations in Embodiment 1.
Figure 7A:
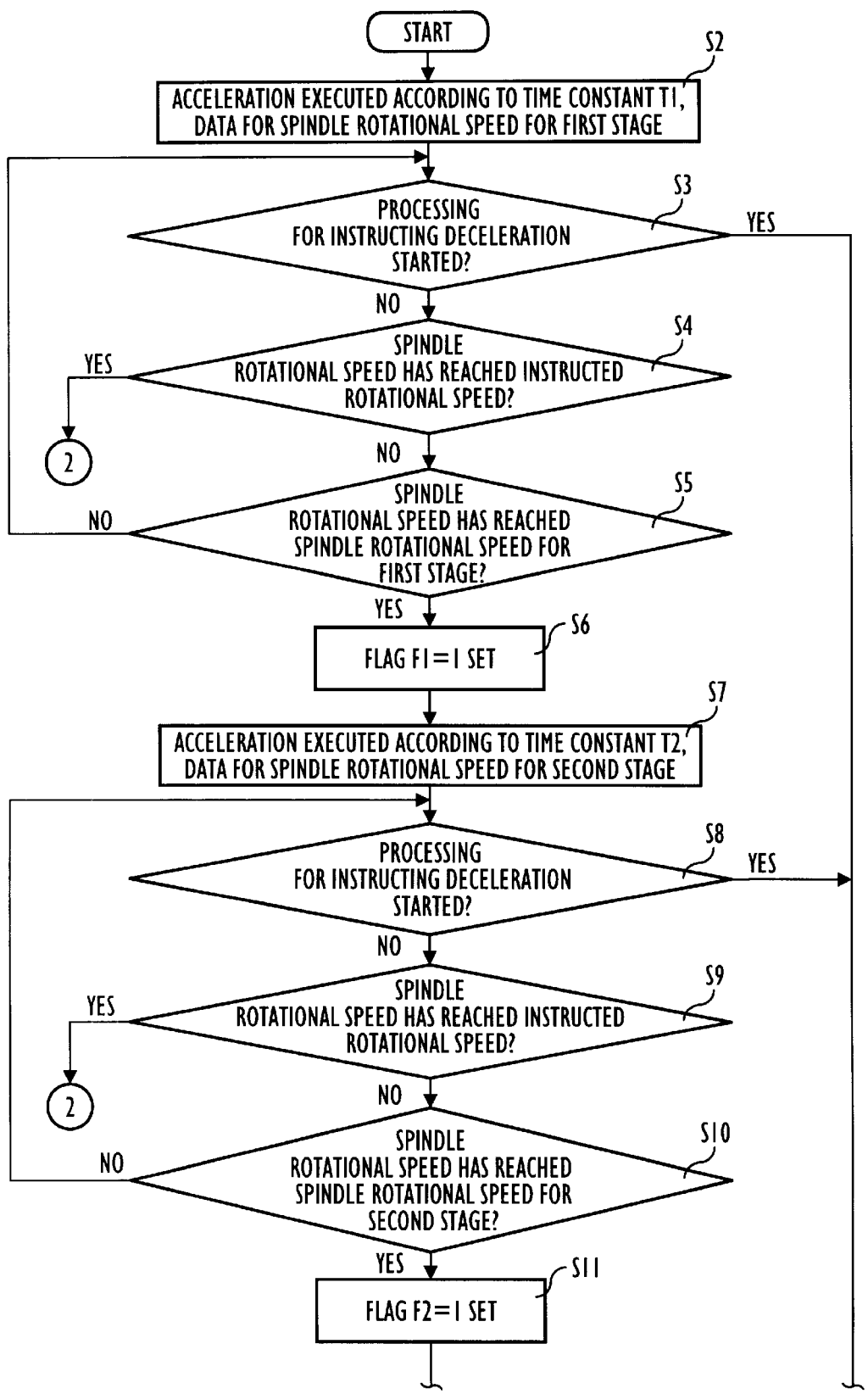
FIGS. 7A and 7B are flow charts showing the first half section of the processing for tapping operations in Embodiment 1.
Figure 7B:
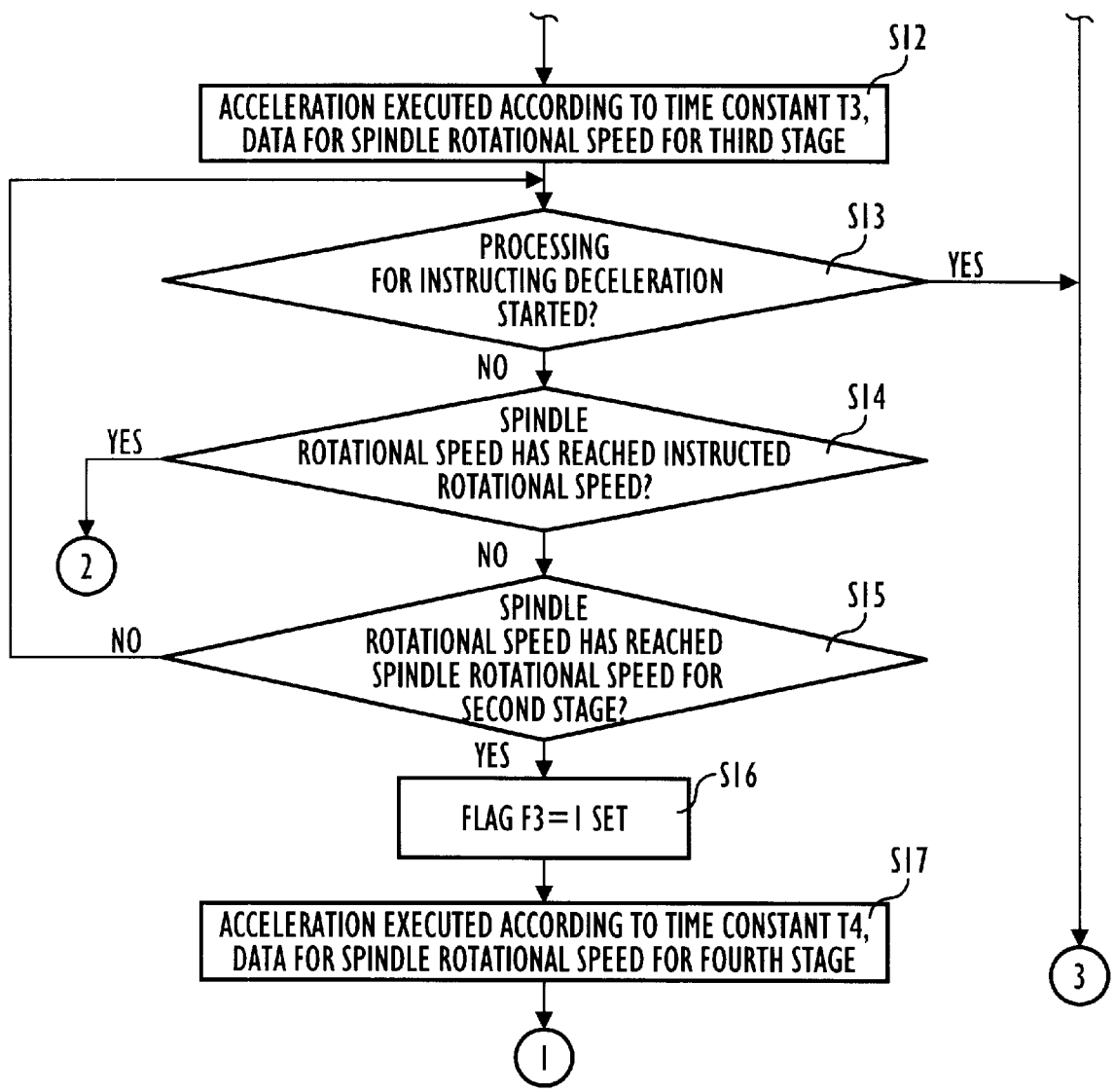
Figure 8A:
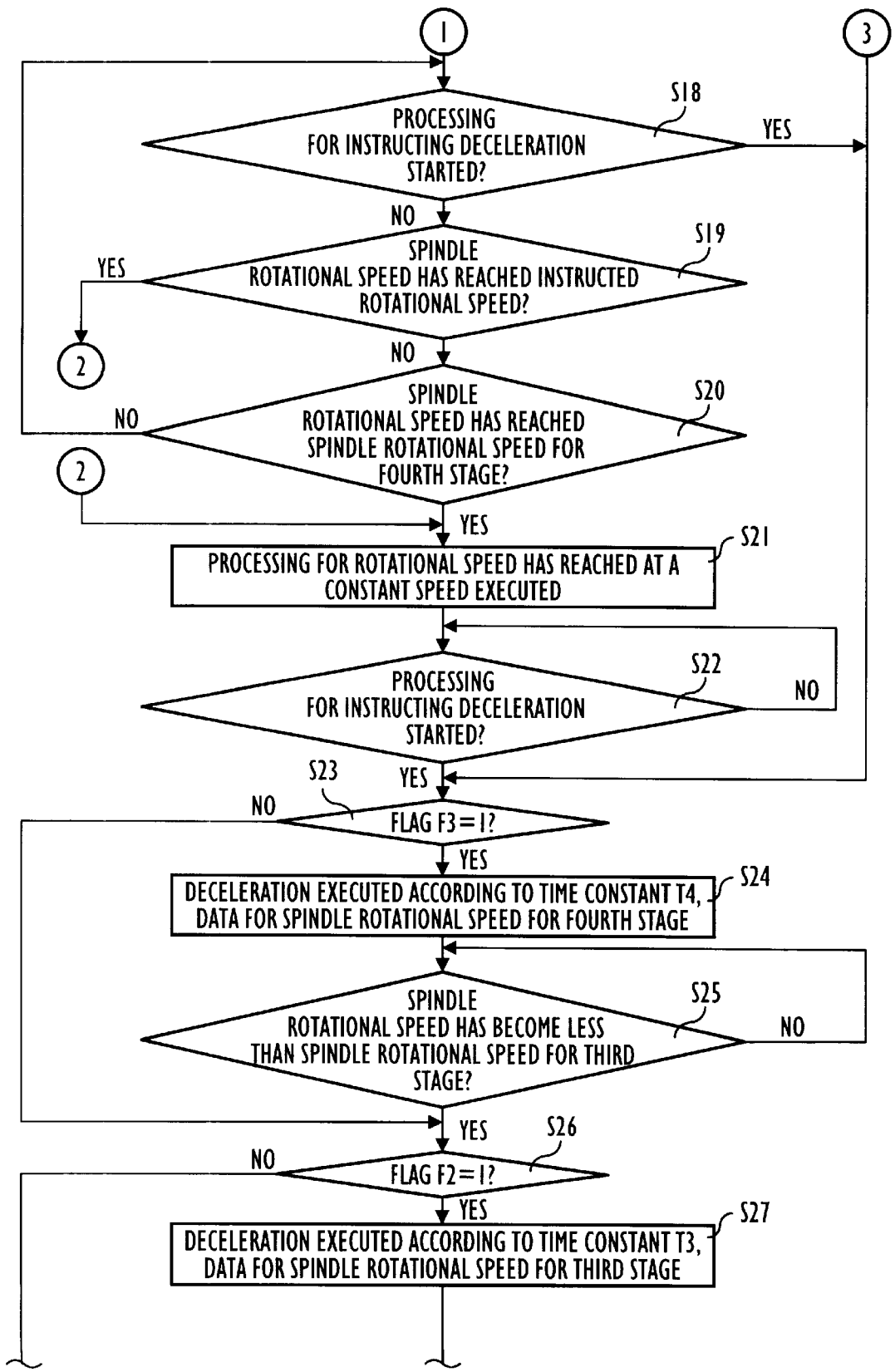
FIGS. 8A and 8B are flow charts showing the second half section of the processing for tapping operations in Embodiment 1.
Figure 8B:
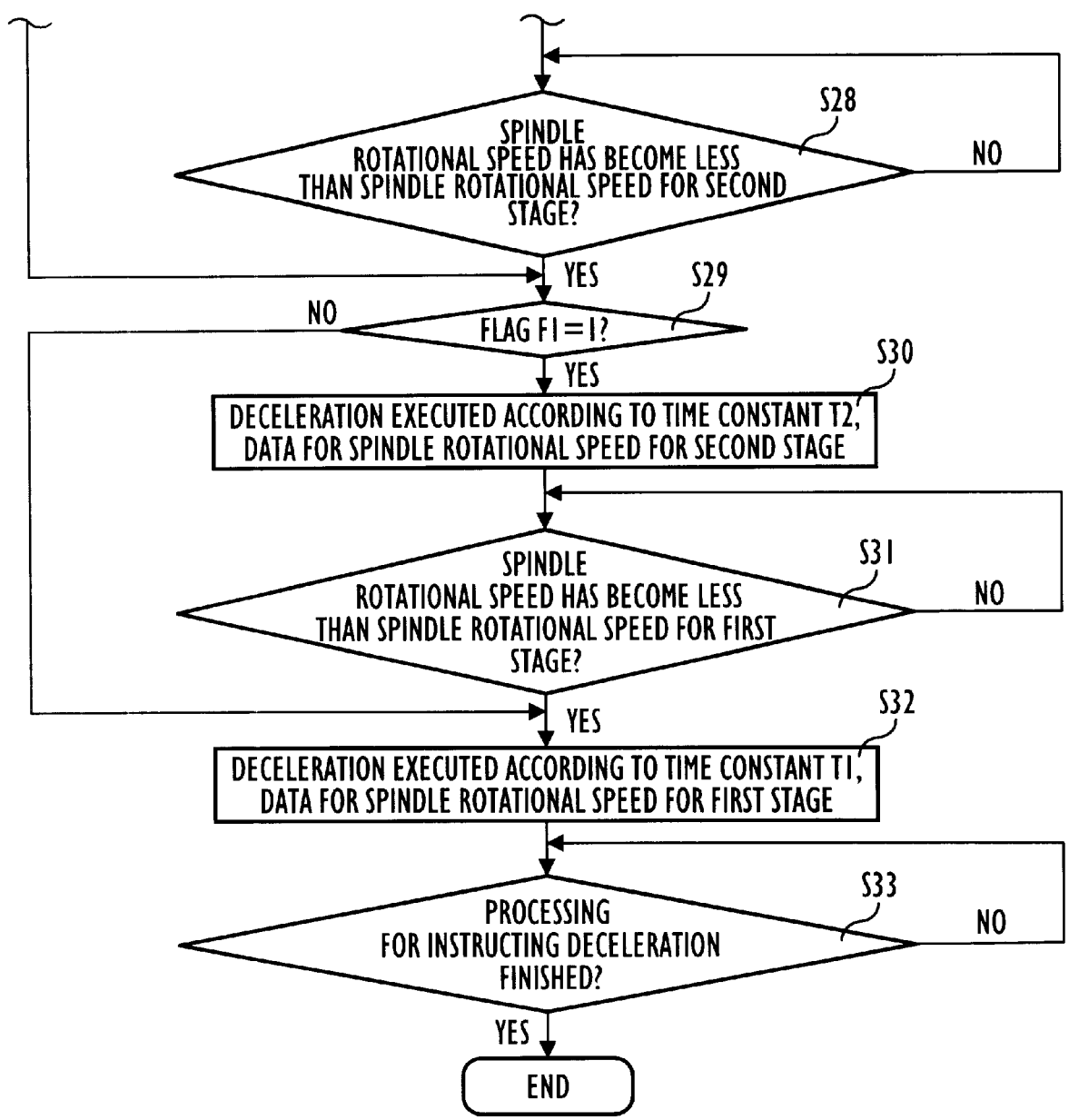

FIG. 6 is a flow chart showing the initialization processing executed only once when a tap cutting operation or a tap pulling-off operation is started. In this initialization processing, flags F1 to F3 used in the tap machining routine shown in FIGS. 7A and 7B and FIGS. 8A and 8B are initialized, namely the flags F1 to F3 are set to "0" respectively (step S1).

FIGS. 7A and 7B and FIGS. 8A and 8B are flow charts showing the tap cutting operation or tap pulling-off operation respectively, and next description is made for the tap cutting operation or tap-pulling-off operation with reference to the data stored in the spindle acceleration/deceleration pattern data storing section 3, acceleration output instructions of the spindle acceleration/deceleration control section shown in FIG. 4, and the deceleration output instructions of the spindle acceleration/deceleration control section 4 shown in FIG. 5.

After the initialization processing (step S1 in FIG. 6) is complete, processing for accelerating the servo axis for maintaining synchronism between the spindle and the servo axis; namely processing for instructing acceleration for the first stage is executed according to the acceleration output instruction A1 for the first stage shown in FIG. 4 based on the machining data instructed by the machining program P, the time constant T1 for the first stage and the spindle rotational speed SPD1 for the first stage each stored in the spindle acceleration/deceleration pattern data storing section 3 (step S2).

Then determination is made as to whether processing for instructing deceleration should be started according to a instruction value for movement of the servo axis for maintaining synchronism with the spindle instructed by the machining program P or not (step S3).

If it is determined that the processing for instructing deceleration is to be started, the processing for instructing acceleration for the first stage is finished, the system control shifts to step S23, and the processing for instructing deceleration is started.

In contrast, if it is not determined that the processing for instructing deceleration is to be started, the processing for acceleration for the first stage is continued, and determination is made as to whether a spindle rotational speed of the spindle motor 23 has reached the spindle rotational speed instructed by the machining program P or not (step S4).

If it is determined that the spindle rotational speed of the spindle motor 23 has reached the spindle rotational speed instructed by the machining program P, the processing for instructing acceleration for the first stage is finished, the system control shifts to step S21, and processing for instructing rotation at a constant speed is started.

In contrast, if it is not determined that the spindle rotational speed of the spindle motor 23 has not reached the spindle rotational speed instructed by the machining program P, the processing for instructing acceleration for the first stage is continued, and determination is made as to whether the spindle rotational speed of the spindle motor 23 has reached the spindle rotational speed SPD1 for the first stage stored in the spindle acceleration/deceleration pattern data storing section 3 or not (step S5).

If it is not determined that the spindle rotational speed of the spindle 23 has reached the spindle rotational speed SPD1 for the first stage, the processing for instructing acceleration for the first stage is continued, the system control returns to step S3, and again determination is made as to whether the processing for instructing acceleration for the first stage is to be finished or not (step S3 to step S5).

In contrast, if it is determined that the spindle rotational speed of the spindle motor 23 has reached the spindle rotational speed SPD1 for the first stage, the processing for instructing acceleration for the first stage is finished, the flag F1 is set to "1" (step S6), and processing for instructing acceleration for the second stage is executed according to the acceleration output instruction A2 for the second stage shown in FIG. 4 based on the machining data instructed by the machining program P, the time constant T2 for the second stage and the spindle rotational speed SPD2 for the second stage each stored in the spindle acceleration/deceleration pattern data storing section 3 (step S7).

Then determination is made as to whether processing for instructing deceleration should be started according to an instruction value for movement of the servo axis for maintaining synchronism instructed by the machining program P or not (step S8).

If it is determined that the processing for instructing deceleration is to be started, the processing for instructing acceleration for the second stage is finished, system control shifts to step S23, and the processing for instructing deceleration is started.

In contrast, if it is not determined that the processing for instructing deceleration is to be started, the processing for instructing acceleration for the second stage is continued, and determination is made as to whether the spindle rotational speed of the spindle motor 23 has reached the spindle rotational speed instructed by the machining program P or not (step S9).

If it is determined that the spindle rotational speed of the spindle motor 23 has reached the spindle rotational speed instructed by the machining program P, the processing for instructing acceleration for the second stage is finished, system control shifts to step S21, and processing for instructing rotation at a constant speed is started.

In contrast, if it is not determined that the spindle rotational speed of the spindle motor 23 has reached the spindle rotational speed instructed by the machining program P, the processing for instructing acceleration for the second stage is continued, and determination is made as to whether the spindle rotational speed of the spindle motor 23 has reached the spindle rotational speed SPD2 for the second stage stored in the spindle acceleration/deceleration pattern data storing section 3 or not (step S10).

If it is not determined that the spindle rotational speed of the spindle motor 23 has reached the spindle rotational speed SPD2 for the second stage, the processing for instructing acceleration for the second stage is continued, system control returns to step S8, and again determination is made as to whether the processing for instructing acceleration for the second stage is to be finished or not (step S8 to step S10).

In contrast, if it is determined that the spindle rotational speed of the spindle motor 23 has reached the spindle rotational speed SPD2 for the second stage, processing for instructing acceleration for the second stage is finished, the flag F2 is set to "1" (step S1), and processing for instructing acceleration for the third stage is executed according to the acceleration output instruction A3 for the third stage shown in FIG. 4 based on the machining data instructed by the machining program P, the time constant T3 for the third stage and the spindle rotational speed SPD3 for the third stage each stored in the spindle acceleration/deceleration pattern data storing section 3 (step S12).

Then determination is made as to whether processing for instructing deceleration should be executed according to an instruction value for movement of the servo axis for maintaining synchronism with the spindle instructed by the machining program P or not (step S13).

If it is determined that the processing for instructing deceleration is to be started, the processing for instructing acceleration for the third stage is finished, system control shifts to step S23, and the processing for instructing deceleration is started.

In contrast, if it is not determined that the processing for instructing deceleration is to be started, the processing for instructing acceleration for the third stage is continued, and determination is made as to whether a spindle rotational speed of the spindle motor 23 has reached the spindle rotational speed instructed by the machining program P (step S14).

If it is determined that the spindle rotational speed of the spindle motor 23 has reached the spindle rotational speed instructed by the machining program P, the processing for instructing acceleration for the third stage is finished, system control shifts to step S21, and processing for instructing rotation at a constant speed is started.

In contrast, it is not determined that the spindle rotational speed of the spindle motor 23 has reached the spindle rotational speed instructed by the machining program P, the processing for instructing acceleration for the third stage is continued, and determination is made as to whether the spindle rotational speed of the spindle motor 23 has reached the spindle rotational speed SPD3 for the third stage stored in the spindle acceleration/deceleration pattern data storing section 3 or not (step S15).

If it is not determined that the spindle rotational speed of the spindle motor 23 has reached the spindle rotational speed SPD3 for the third stage, the processing for instructing acceleration for the third stage is continued, system control returns to step S13, and again determination is made to whether the processing for instructing acceleration for the third stage should be finished or not (step S13 to step S15).

In contrast, if it is determined that the main rotational speed of the spindle motor 23 has reached the spindle rotational speed SPD3 for the third stage, the processing for instructing acceleration for the third stage is finished, the flag F3 is set to "1" (step S16), and processing for instructing acceleration for the fourth stage is executed according to the acceleration output instruction A4 shown in FIG. 4 based on the machining data instructed by the machining program P, the time constant T4 for the fourth stage and the spindle rotational speed SPD4 for the fourth stage each stored in the spindle acceleration/deceleration pattern data storing section 3 (step S17).

Then in FIG. 8, determination is made as to processing for instructing deceleration should be started according to an instruction value for movement of the servo axis for maintaining synchronism with the spindle instructed by the machining program P or not (step S18).

If it is determined that the processing for instructing deceleration is to be started, the processing for instructing acceleration for the fourth stage is finished, system control shifts to step S23, and the processing for instructing deceleration is started.

In contrast, if it is not determined that the processing for instructing deceleration is to be started, the processing for instructing acceleration for the fourth stage is continued, and determination is made as to whether the spindle rotational speed of the spindle motor 23 has reached the spindle rotational speed instructed by the machining program P or not (step S19).

If it is determined that the spindle rotational speed of the spindle motor 23 has reached the spindle rotational speed instructed by the machining program P, the processing for instructing acceleration for the fourth stage is finished, system control returns to step S21, and processing for instructing rotation at a constant speed is instructed.

In contract, if it is not determined that the spindle rotational speed of the spindle motor 23 has reached the spindle rotational speed instructed by the machining program P, the processing for instructing acceleration for the fourth stage is continued, and determination is made as to whether the spindle rotational speed of the spindle motor 23 has reached the spindle rotational speed SPD4 for the fourth stage stored in the spindle acceleration/deceleration pattern data storing section 3 or not (step S20).

If it is not determined that the spindle rotational speed of the spindle motor 23 has reached the spindle rotational speed SPD4 for the fourth stage, the processing for instructing acceleration for the fourth stage is continued, system control returns to step S18, and again determination is made as to whether the processing for acceleration for the fourth stage is to be finished or not (step S18 to step S20).

In contrast, if it is determined that the spindle rotational speed of the spindle motor 23 has reached the spindle rotational speed SPD4 for the fourth stage, the processing for instructing acceleration for the fourth stage is finished, and the processing for outputting instruction S for instructing rotation at a constant speed according to an output instruction for rotation at a constant speed shown in FIG. 4 is started according to the machining data instructed by the machining program P (step S21).

Then determination is made as to whether processing for deceleration should be started according to an instruction value for movement of the servo axis for maintaining synchronism with the spindle instructed by the machining program P or not (step S22). If it is not determined that the processing for instructing deceleration is to be started, the processing for instructing rotation at a constant speed according to the output instruction S for rotation at a constant speed is continued, and again step S22 is executed. In contrast, if it is determined that the processing for instructing deceleration is to be started, the processing for instructing rotation at a constant speed is finished, and system control shifts to step S23.

In step S23, determination is made as to whether the processing for instructing deceleration for the fourth stage should be executed or not by checking whether the flag F3 has been set to "1" or not.

If it is not determined that the flag F3 has been set to "1", system control shifts to step S26, and the processing for determination is executed as to whether the processing for deceleration for the third stage should be executed or not.

In contrast, if it is determined that the flag F3 has been set to "1", the processing for deceleration for the fourth stage is executed according to the deceleration output instruction D4 is executed shown in FIG. 5 based on the machining data instructed by the machining program P, and time constant T4 for the fourth stage and the spindle rotational speed SPD4 for the fourth stage each stored in the spindle acceleration/deceleration pattern data storing section 3 (step S24).

Then determination is made as to whether the spindle rotational speed of the spindle motor 23 has become less than the spindle rotational speed SPD3 for the third stage stored in the spindle acceleration/deceleration pattern data storing section 3 or not (step S25).

If it is not determined that the spindle rotational speed of the spindle motor 23 has become less than the spindle rotational speed SPD3 for the third stage, the processing for instructing deceleration for the fourth stage is continued, and again step S25 is executed.

In contrast, if it is determined that the spindle rotational speed of the spindle motor 23 has become less than the spindle rotational speed SPD3 for the third stage, determination is made as to whether the processing for instructing deceleration for the third stage is to be executed or not by checking whether the flag F2 has been set to "1" or not (step S26).

Then, if it is not determined that the flag F2 has been set to "1", system control shifts to step S29, and determination is made as to whether the processing for instructing deceleration for the second stage should be executed or not.

In contrast, if it is determined that the flag F2 has been set to "1", the processing for instructing deceleration for the third stage is executed according to the deceleration output instruction D3 for the third stage shown in FIG. 5 based on the machining data instructed by the machining program P and the time constant T3 as well as the spindle rotational speed SPD3 for the third stage each stored in the spindle acceleration/deceleration pattern data storing section 3 (step S27).

Then determination is made as to whether the spindle rotational speed of the spindle motor 23 has become less than the spindle rotational speed SPD2 for the second stage stored in the spindle acceleration/deceleration pattern data storing section 3 or not (step S28).

If it is not determined that the spindle rotational speed of the spindle motor 23 has become less than the spindle rotational speed SPD2 for the second stage, the processing for instructing deceleration for the third stage is continued, and again step S28 is executed.

In contrast, if it is determined that the spindle rotational speed of the spindle motor 23 has become less than the spindle rotational speed SPD2 for the second stage, determination is made as to the processing for instructing deceleration for the second stage is to be executed or not by checking whether the flag F1 has been set to "1" (step S29).

If it is not determined that the flag F1 has been set to "1", system control shifts to step S32, and the processing for instructing deceleration for the first stage is executed.

In contrast, if it is determined that the flag F1 has been set to "1", the processing for instructing deceleration for the second stage is executed according to the deceleration output instruction D2 for the second stage shown in FIG. 5 based the machining data instructed by the machining program P, and the time constant T2 for the second stage and the spindle rotational speed SPD2 for the second stage each stored in the spindle acceleration/deceleration pattern data storing section 3 (step S30).

Then determination is made as to whether the spindle rotational speed of the spindle motor 23 has become less than the spindle rotational speed SPD1 for the first stage stored in the spindle acceleration/deceleration pattern data storing section 3 or not (step S31).

If it is not determined that the spindle rotational speed of the spindle motor 23 has become less than the spindle rotational speed SPD 1 for the first stage, the processing for instructing deceleration for the second stage is continued, and again step S31 is executed.

In contrast, if it is determined that the spindle rotational speed of the spindle motor 23 has become less than the mains shaft rotational speed SPD1 for the first stage, then the processing for instructing deceleration for the first stage is executed according to the deceleration output instruction D1 for the first stage shown in FIG. 5 based on the machining data instructed by the machining program P, and the time constant T1 for the first stage as well as the spindle rotational speed SPD1 for the first stage each stored in the spindle acceleration/deceleration pattern data storing section 3 (step S32).

Then determination is made as to the processing for deceleration for the first stage is to be finished or not according to an instruction value for movement of the servo axis for maintaining synchronism with the spindle instructed by the machining program P (step S33), and if it is determined that the processing for instructing deceleration for the first stage is to be finished, the tap cutting operation or tap pulling-off operation is finished. If it is not determined that the processing for instructing deceleration for the first stage is to be finished, the processing for instructing acceleration for the first stage is continued, and again step S33 is executed.

As a result, the spindle motor 23 in the position loop control state can be controlled with an acceleration/deceleration pattern similar to that of the spindle motor in the velocity loop control state shown in FIG. 2, namely with the acceleration/deceleration pattern most suited to acceleration or deceleration of the spindle motor 23 according to each acceleration output instruction, namely, acceleration output instruction A1 for the first stage, acceleration output instruction A2 for the second stage, acceleration output instruction A3 for the third stage, acceleration output instruction A4 for the fourth stage, each shown in FIG. 4 as well as each deceleration output instruction, namely, deceleration output instruction D4 for the fourth stage, deceleration output instruction D3 for the third stage, deceleration output instruction D2 for the second state, deceleration output instruction D1 for the first stage, each shown in FIG. 5.

With this feature, response capability of the spindle motor 23 is improved with the cycle time required for tapping shortened, and for this reason even in a case where a method of making larger a slope in acceleration/deceleration (acceleration) is employed, a delay of the spindle motor 23 against the servo axis motor 21 is hardly generated at a point of time just before when acceleration is started from the stopped state or when acceleration is finished (to enter rotation at a constant speed), or at a point of time just before deceleration from rotation at a constant speed is started or before deceleration is finished (to stop rotation of the spindle motor 23), which makes it possible not only to improve the machining precision, but also to shorten the cycle time.

It should be noted that, although spindle acceleration/deceleration pattern data for four stages is stored in the spindle acceleration/deceleration pattern data storing section 3 for controlling the spindle motor 23 in the position loop control state with an acceleration/deceleration pattern similar to that of the spindle motor 23 in the velocity loop control state in the embodiment described above, spindle acceleration/deceleration pattern data for five or more stages may be prepared.

Figure 9:
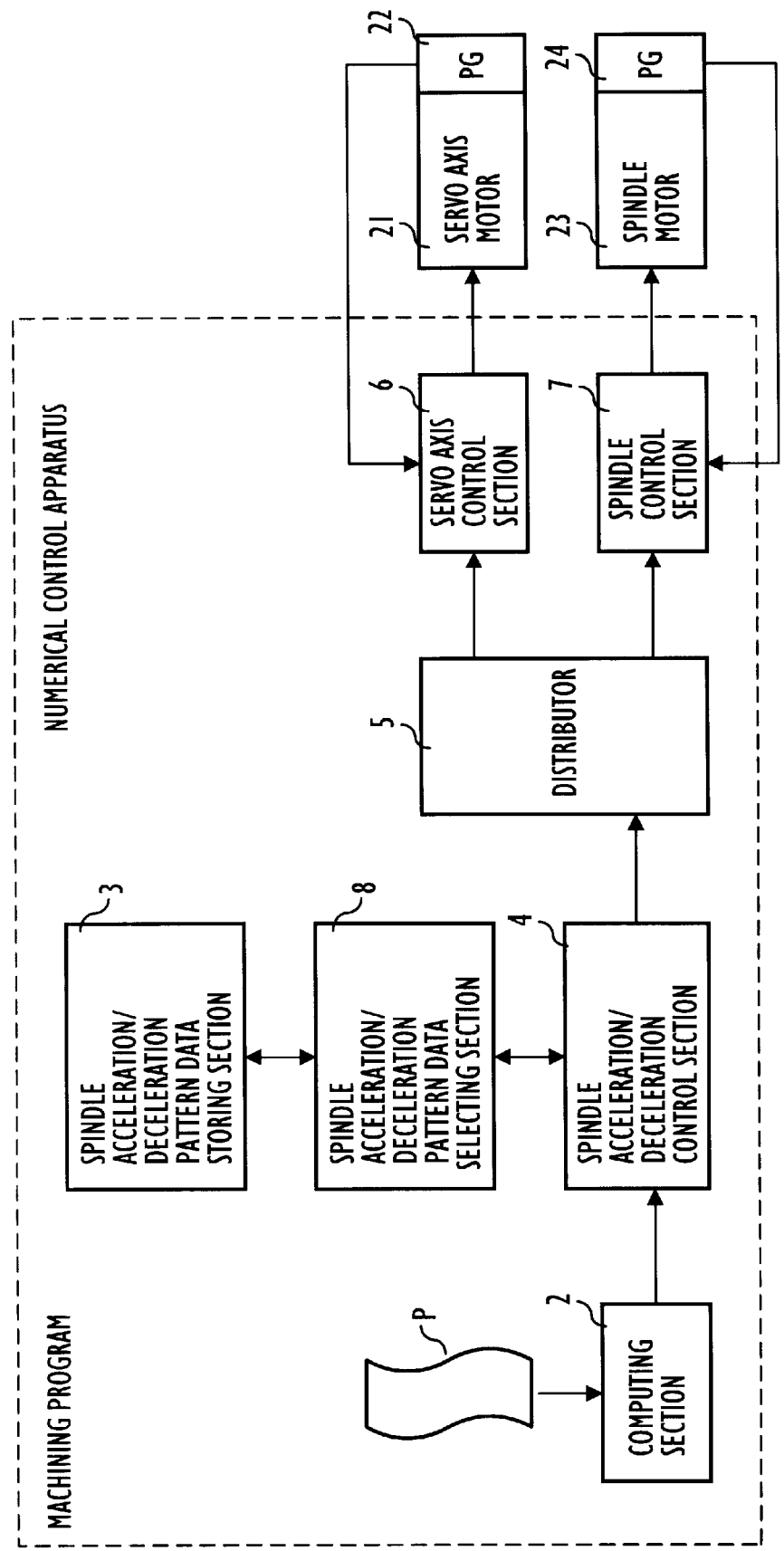
FIG. 9 is a block diagram showing key configuration of the numerical control apparatus according to Embodiment 2 of the present invention.

FIG. 9 shows configuration of the numerical control unit according to Embodiment 2 of the present invention. It should be noted that, in FIG. 9, the same reference numerals are assigned to the sections corresponding to those in FIG. 1 and description thereof is omitted herein.

In this embodiment, the spindle acceleration/deceleration pattern data storing section 3 stores therein a plurality type of spindle acceleration/deceleration pattern data for controlling the spindle motor 23 in the position loop control state with acceleration/deceleration pattern data similar to that for the spindle motor in the velocity loop control state, and provided is a spindle acceleration/deceleration pattern data selecting section 8 for selecting arbitrary spindle acceleration/deceleration pattern data from said plurality type of data stored in the spindle acceleration/deceleration pattern data storing section 3.

The spindle acceleration/deceleration control section 4 computes an instruction for controlling the spindle motor 23 in the position loop control state with acceleration/deceleration pattern similar to that for the spindle motor in the velocity loop control state according to the spindle acceleration/deceleration pattern data selected by the spindle acceleration/deceleration pattern data selecting section 8.

FIG. 10 shows an example of storage of a plurality types of spindle acceleration/deceleration pattern data in the spindle acceleration/deceleration pattern data storing section 3. In this example, 4 types, No. 1 to No. 4, of spindle acceleration/deceleration pattern data are stored in the spindle acceleration/deceleration pattern data storing section 3.

The spindle acceleration/deceleration pattern data corresponding to the spindle acceleration/deceleration pattern No. 1 comprises a time constant T11 for the first stage, a time constant T12 for the second stage, a time constant T13 for the third stage, a spindle rotational speed SPD11 for the first stage, a spindle rotational speed SPD12 for the second stage, and a spindle rotational speed SPD13 for the third stage; spindle acceleration/deceleration pattern data corresponding to the spindle acceleration/deceleration pattern No. 2 comprises a time constant T21 for the first stage, a time constant T22 for the second stage, a time constant T23 for the third stage, a spindle rotational speed SPD21 for the first stage, a spindle rotational speed SPD22 for the second stage, and a spindle rotational speed SPD23 for the third stage; the spindle acceleration/deceleration pattern data corresponding to spindle acceleration/deceleration pattern No. 3 comprises a time constant T31 for the first stage, a time constant T32 for the second stage, a time constant T33 for the third stage, a time constant T34 for the fourth stage, a spindle rotational speed SPD31 for the first stage, a spindle rotational speed SPD32 for the second stage, a spindle rotational speed SPD33 for the third stage, and a spindle rotational speed SPD34 for the fourth stage; and the spindle acceleration/deceleration pattern data corresponding to spindle acceleration/deceleration pattern No. 4 comprises a time constant T41 for the first stage, a time constant T42 for the second stage, a time constant T43 for the third stage, a time constant T44 for the fourth stage, a spindle rotational speed SPD41 for the first stage, a spindle rotational speed SPD42 for the second stage, a spindle rotational speed SPD43 for the third stage, and a spindle rotational speed SPD44 for the fourth stage.

In each spindle acceleration/deceleration pattern data group, the time constants T11, T21, T31, T41 for the first stage and the spindle rotational speeds SPD11, SPD21, SPD31, and SPD41 are spindle acceleration/deceleration pattern data for deciding a slope in acceleration/deceleration in the first stage; the time constants T12, T22, T32, T42 for the second stage and the spindle rotational speeds SPD12, SPD22, SPD32, SPD42 for the second stage are spindle acceleration/deceleration pattern data for deciding a slope in acceleration/deceleration in the second stage; time constants T13, T23, T33, T43 for the third stage and the spindle rotational speeds SPD13, SPD23, SPD33, SPD43 for the third stage are spindle acceleration/deceleration pattern data for deciding a slope in acceleration/deceleration in the third stage; and the time constants T34, T44 for the fourth stage and the spindle rotational speeds SPD34, SPD 44 for the fourth stage are spindle acceleration/deceleration pattern data for deciding a slope in acceleration/deceleration in the fourth stage.

FIG. 11 shows an example of an output instruction for a tapping operation from the spindle acceleration/deceleration control section 4. In FIG. 11, ① indicates an acceleration/deceleration output instruction based on the spindle acceleration/deceleration pattern data corresponding to spindle acceleration/deceleration pattern No. 1 stored in the spindle acceleration/deceleration pattern data storing section 3; ② indicates an acceleration/deceleration output instruction based on the spindle acceleration/deceleration pattern data corresponding to spindle acceleration/deceleration No. 2 stored in the spindle acceleration/deceleration pattern data storing section 3; ③ indicates an acceleration/deceleration output instruction based on the spindle acceleration/deceleration pattern data corresponding to spindle acceleration/deceleration pattern data No. 3 stored in the spindle acceleration/deceleration pattern data storing section 3, and ④ indicates an acceleration/deceleration output instruction based on the spindle acceleration/deceleration pattern data corresponding to spindle acceleration/deceleration pattern No. 4 stored in the spindle acceleration/deceleration pattern data storing section 3.

The acceleration/deceleration output instructions ① to ④ select optimal spindle acceleration/deceleration pattern data from a plurality types of spindle acceleration/deceleration pattern data groups stored in the spindle acceleration/deceleration pattern data storing section 3 according to material of a work (not shown herein), and material and form of a tool (not shown), and enables execution of the acceleration/deceleration output instructions according to the selected spindle acceleration/deceleration pattern data.

Figure 12:
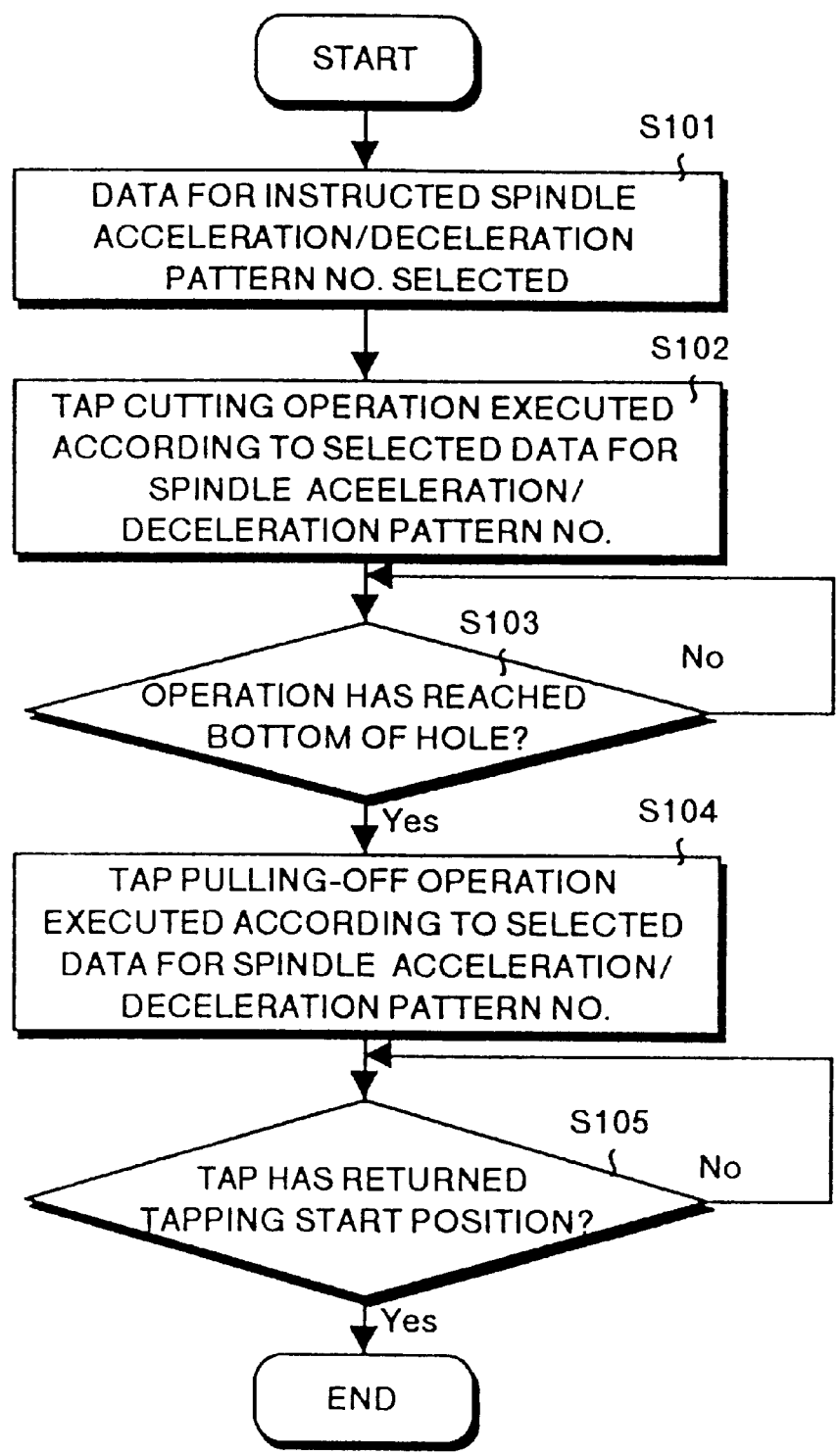
FIG. 12 is a flow chart showing processing for tapping operation in Embodiment 2.

FIG. 12 is a flow chart of tapping in this embodiment, and next description is made for this flow chart with reference to the spindle acceleration/deceleration pattern data groups stored in the spindle acceleration/deceleration pattern data storing section 3 shown in FIG. 10 and to the acceleration/deceleration output instructions in the spindle acceleration/deceleration control section 4 shown in FIG. 11.

At first, the spindle acceleration/deceleration pattern data selecting section 8 selects the spindle acceleration/deceleration pattern data corresponding to the spindle acceleration/deceleration pattern No. instructed by the machining program P according to material of a work (not shown) and material and form of a tool (not shown) from the spindle acceleration/deceleration pattern data storing section 3 (step S101). The description below assumes a case where the spindle acceleration/deceleration pattern data corresponding to the spindle acceleration/deceleration pattern No. 2 shown in FIG. 10 is selected.

Then, processing for instructing a tap cutting operation shown in FIG. 11 is executed according to machining data instructed by the machining program P as well as to the selected spindle acceleration/deceleration pattern data corresponding to spindle acceleration/deceleration pattern No. 2 shown in FIG. 10 (step S102).

Then determination is made as to whether the tap cutting operation has reached to a bottom of the hole or not (step S103), and if it is not determined that the tap cutting operation has reached the hole bottom, the processing for instructing the tap cutting operation is continued. In contrast, if it is determined that the tap cutting operation has reached the bottom of the hole, the processing for instructing the tap cutting operation is finished, and processing for a tap pulling-off operation shown in FIG. 11 is executed according to machining data instructed by the machining program P and the selected spindle acceleration/deceleration pattern data corresponding to spindle acceleration/deceleration pattern No. 2 shown in FIG. 10 (step S104).

Then determination is made as to the tap has returned to the tapping start position or not (step S105), if it is determined that the tap has returned to the tapping start position, the processing for a tapping operation is finished. If it is not determined that the tap has returned to the tapping start position, the processing for instructing the tap pulling-off operation is continued, and step S105 is executed again.

As a result, it is possible not only to control the spindle motor 23 in the position loop control state with an acceleration/deceleration pattern similar to that of the spindle motor in the velocity loop control state, but also to control the spindle motor in the position loop control state with an optimal acceleration/deceleration pattern according to data concerning material of a work (not shown), and material and form of a tool (not shown) selected from a plurality types of acceleration/deceleration pattern data groups.

With this feature, response capability of the spindle motor 23 is improved without fail with a cycle time for an tapping operation shortened, so that, even in a case where a method of making larger a slope in acceleration/deceleration is employed, an efficient tapping operation and improvement of tapping precision can be realized.

It should be noted that, although 4 types of spindle acceleration/deceleration pattern data (those corresponding to spindle acceleration/deceleration pattern No. 1 to No. 4) are stored in the spindle acceleration/deceleration pattern data storing section 3 to control the spindle motor 23 in the position loop control state with an acceleration/deceleration pattern similar to that in the velocity loop control state, but the number of types of spindle acceleration/deceleration pattern data is not limited to 4 types.

FIG. 13 shows the numerical control apparatus according to Embodiment 3 of the present invention. It should be noted that, in FIG. 13, the same reference numerals are assigned to the sections corresponding to those in FIG. 1 and FIG. 9, and description thereof is omitted herein.

In this embodiment, an input section 9 for describing and setting a spindle acceleration/deceleration pattern number in a tap cutting operation and a spindle acceleration/deceleration pattern number in a tap pulling-off operation is provided in a machining program P.

The spindle acceleration/deceleration pattern data selecting section 8 selects the spindle acceleration/deceleration pattern data for a tap cutting operation and the spindle acceleration/deceleration pattern data for a tap pulling-off operation according to the number (type) instructed by the machining program P from a plurality types of data stored in the spindle acceleration/deceleration pattern data storing section 3 and reads the selected data out.

In this case also, the spindle acceleration/deceleration control section 4 computes an instruction for controlling the spindle motor 23 in the position loop control state with an acceleration/deceleration pattern similar to an acceleration/deceleration pattern for the spindle motor in the velocity loop control state according to the acceleration/deceleration pattern data selected by the spindle acceleration/deceleration pattern data selecting section 8.

FIG. 14 shows an example of storage of the plurality types of spindle acceleration/deceleration pattern data in the spindle acceleration/deceleration pattern data storing section 3. In this example, four types, No. 1 to No. 4, of spindle acceleration/deceleration pattern data are stored in the spindle acceleration/deceleration pattern data storing section 3.

Spindle acceleration/deceleration pattern data for a spindle acceleration/deceleration pattern No. 1 comprises a time constant T11 for the first stage, a time constant T12 for the second stage, a time constant T13 for the third stage, a spindle rotational speed SPD11 for the first stage, a spindle rotational speed SPD12 for the second stage, and a spindle rotational speed SPD13 for the third stage; spindle acceleration/deceleration pattern data for a spindle acceleration/deceleration pattern No. 2 comprises a time constant T21 for the first stage, a time constant T22 for the second stage, a time constant T23 for the third stage, a time constant T24 for the fourth stage, a spindle rotational speed SPD21 for the first stage, a spindle rotational speed SPD22 for the second stage, a spindle rotational speed SPD23 for the third stage, and a spindle rotational speed SPD24 for the fourth stage; spindle acceleration/deceleration pattern data for a spindle acceleration/deceleration pattern No. 3 comprises a time constant T31 for the first stage, a time constant T32 for the second stage, a time constant T33 for the third stage, a time constant T34 for the fourth stage, a spindle rotational speed SPD31 for the first stage, a spindle rotational speed SPD32 for the second stage, a spindle rotational speed SPD33 for the third stage, and a spindle rotational speed SPD34 for the fourth stage; and spindle acceleration/deceleration pattern data for a spindle acceleration/deceleration pattern No. 4 comprises a time constant T41 for the first stage, a time constant T42 for the second stage, a time constant T43 for the third stage, a time constant T44 for the fourth stage, a time constant T45 for the fifth stage, a spindle rotational speed SPD41 for the first stage, a spindle rotational speed SPD42 for the second stage, a spindle rotational speed SPD43 for the third stage, a spindle rotational speed SPD44 for the fourth stage, and a spindle rotational speed SPD45 for the fifth stage.

In each of spindle acceleration/deceleration pattern data groups, the time constant T11, T21, T31, T41 for the first stage and the spindle rotational speed SPD11, SPD21, SPD31, SPD41 for the first stage are spindle acceleration/deceleration pattern data for deciding a slope of acceleration/deceleration in the first stage; the time constant T12, T22, T32, T42 for the second stage and the spindle rotational speed SPD12, SPD22, SPD32, SPD42 for the second stage are spindle acceleration/deceleration pattern data for deciding a slope of acceleration/deceleration in the second stage; the time constant T13, T23, T33, T34 for the third stage and the spindle rotational speed SPD13, SPD23, SPD33, SPD43 for the third stage are spindle acceleration/deceleration pattern data for deciding a slope of acceleration/deceleration in the third stage; the time constant T24, T34, T44 for the fourth stage and the spindle rotational speed SPD24, SPD34, SPD44 for the fourth stage are spindle acceleration/deceleration pattern data for deciding a slope of acceleration/deceleration in the fourth stage; and the time constant T45 for the fifth stage and the spindle rotational speed SPD45 for the fifth stage are spindle acceleration/deceleration pattern data for deciding a slope of acceleration/deceleration in the fifth stage.

Figure 15:
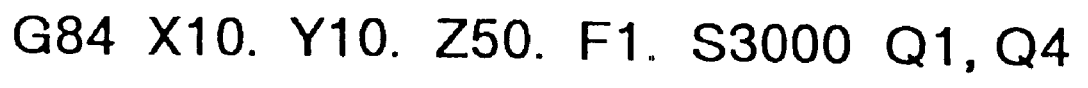

FIG. 15 shows an example of a tapping program in which a spindle acceleration/deceleration pattern number in a tap cutting operation and a spindle acceleration/deceleration pattern number in a tap pulling-off operation are instructed in description for blocks of the machining program P. The instructions of the spindle acceleration/deceleration pattern number in a tap cutting operation and the spindle acceleration/deceleration pattern number in a tap pulling-off operation are executed with entry of "Q__, Q__", and in this example, the spindle acceleration/deceleration pattern number in a tap cutting operation instructs 1, and the spindle acceleration/deceleration pattern number in a tap pulling-off operation instructs 4.

Selection for setting of the spindle acceleration/deceleration pattern data is executed by analyzing the address data "Q__, Q__" described in the machining program P as described above.

Figure 16:
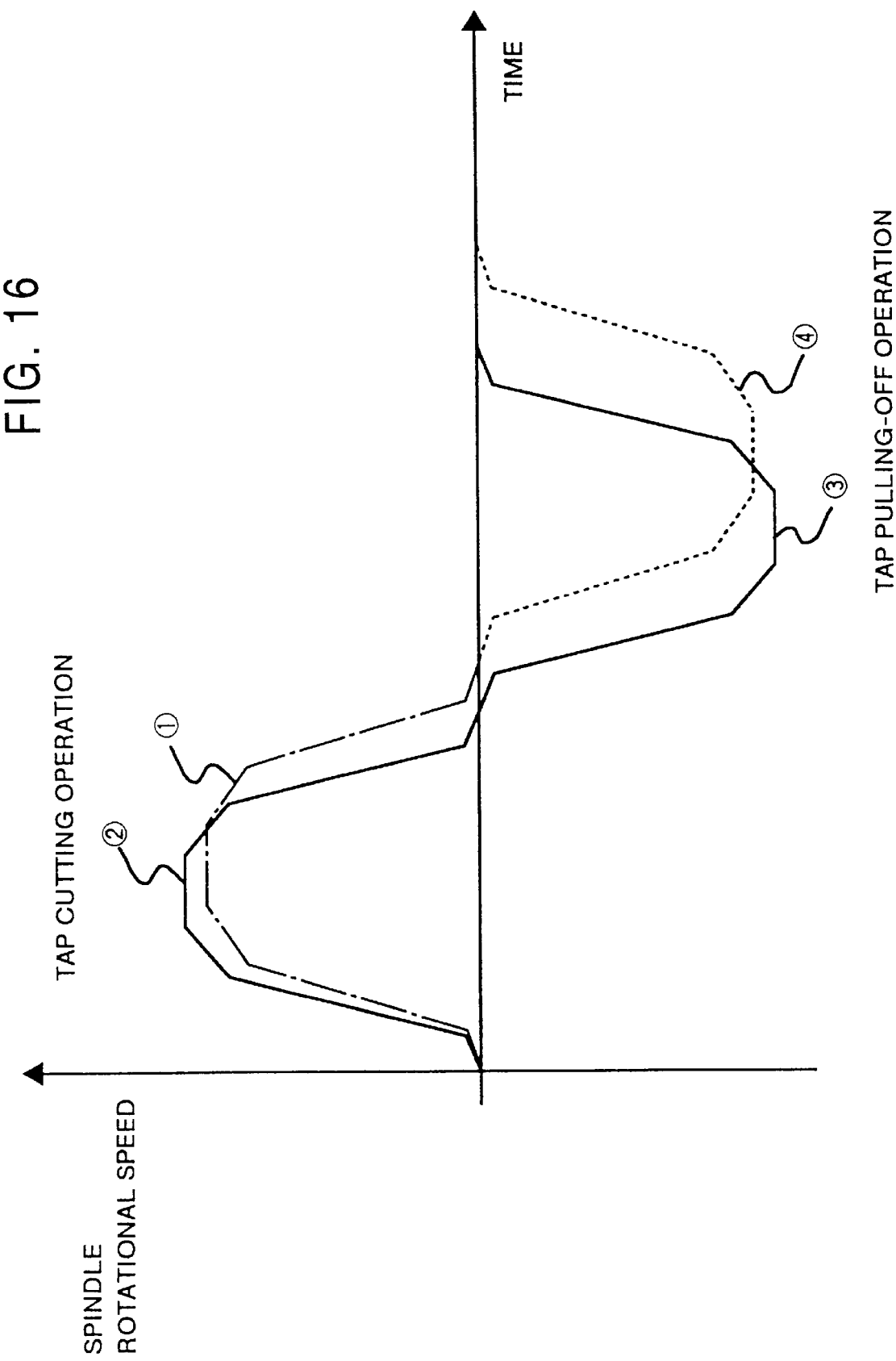
FIG. 16 is a graph showing an example of an output instruction for tapping operation in Embodiment 3.

FIG. 16 shows an example of output instructions for tapping operation in the spindle acceleration/deceleration control section 4 in Embodiment 3. In FIG. 16, designated at the reference numeral ① is an acceleration/deceleration output instruction for tap cutting operation according to the spindle acceleration/deceleration pattern data for the spindle acceleration/deceleration pattern No. 1 stored in the spindle acceleration/deceleration pattern data storing section 3, at ② an acceleration/deceleration output instruction for a tap cutting operation according to the spindle acceleration/deceleration pattern data for the spindle acceleration/deceleration pattern No. 2 stored in the spindle acceleration/deceleration pattern data storing section 3, at ③ an acceleration/deceleration output instruction for a tap pulling-off operation according to the spindle acceleration/deceleration pattern data for the spindle acceleration/deceleration pattern No. 3 stored in the spindle acceleration/deceleration pattern data storing section 3, and at ④ an acceleration/deceleration output instruction for a tap pulling-off operation according to the spindle acceleration/deceleration pattern data for the spindle acceleration/deceleration pattern No. 4 stored in the spindle acceleration/deceleration pattern data storing section 3.

The tap pulling-off operation does not require a cutting operation, so that it can be executed at a higher speed as compared to that of the tap cutting operation. It is understood from the matter described above that, when an acceleration/deceleration output instruction for a tap cutting operation is executed according to the same acceleration/deceleration pattern as that in an acceleration/deceleration output instruction for a tap fulling-off operation, a cycle time required for tapping becomes longer, which is disadvantageous for the efficiency.

For this reason, in the embodiment, the acceleration/deceleration output instructions ③, ④ for the tap pulling-off operation select instructions each having a shorter period of time required for acceleration/deceleration than the acceleration/deceleration pattern according to the acceleration/deceleration output instructions ①, ② for a tap cutting operation from the spindle acceleration/deceleration pattern data storing section 3, and execute an acceleration/deceleration output instruction according to the selected spindle acceleration/deceleration pattern data.

In the example shown in FIG. 16, an acceleration/deceleration output instruction for tap cutting operation is decided according to the spindle acceleration/deceleration pattern data for the spindle acceleration/deceleration pattern No. 1 and to the spindle acceleration/deceleration pattern data for the spindle acceleration/deceleration pattern No. 2 stored in the spindle acceleration/deceleration pattern data for the spindle acceleration/deceleration pattern data storing section 3, however, under various conditions, an acceleration/deceleration output instruction for a tap cutting operation may be decided according to the spindle acceleration/deceleration pattern data for the spindle acceleration/deceleration pattern No. 3 or to the spindle acceleration/deceleration pattern data for the spindle acceleration/deceleration pattern No. 4 stored in the spindle acceleration/deceleration pattern data storing section 3, or an acceleration/deceleration output instruction for a tap pulling-off operation may be decided according to the spindle acceleration/deceleration pattern data for the spindle acceleration/deceleration pattern No. 1 or to the spindle acceleration/deceleration pattern data for the spindle acceleration/deceleration pattern No. 2 stored in the spindle acceleration/deceleration pattern data storing section 3.

Figure 17:
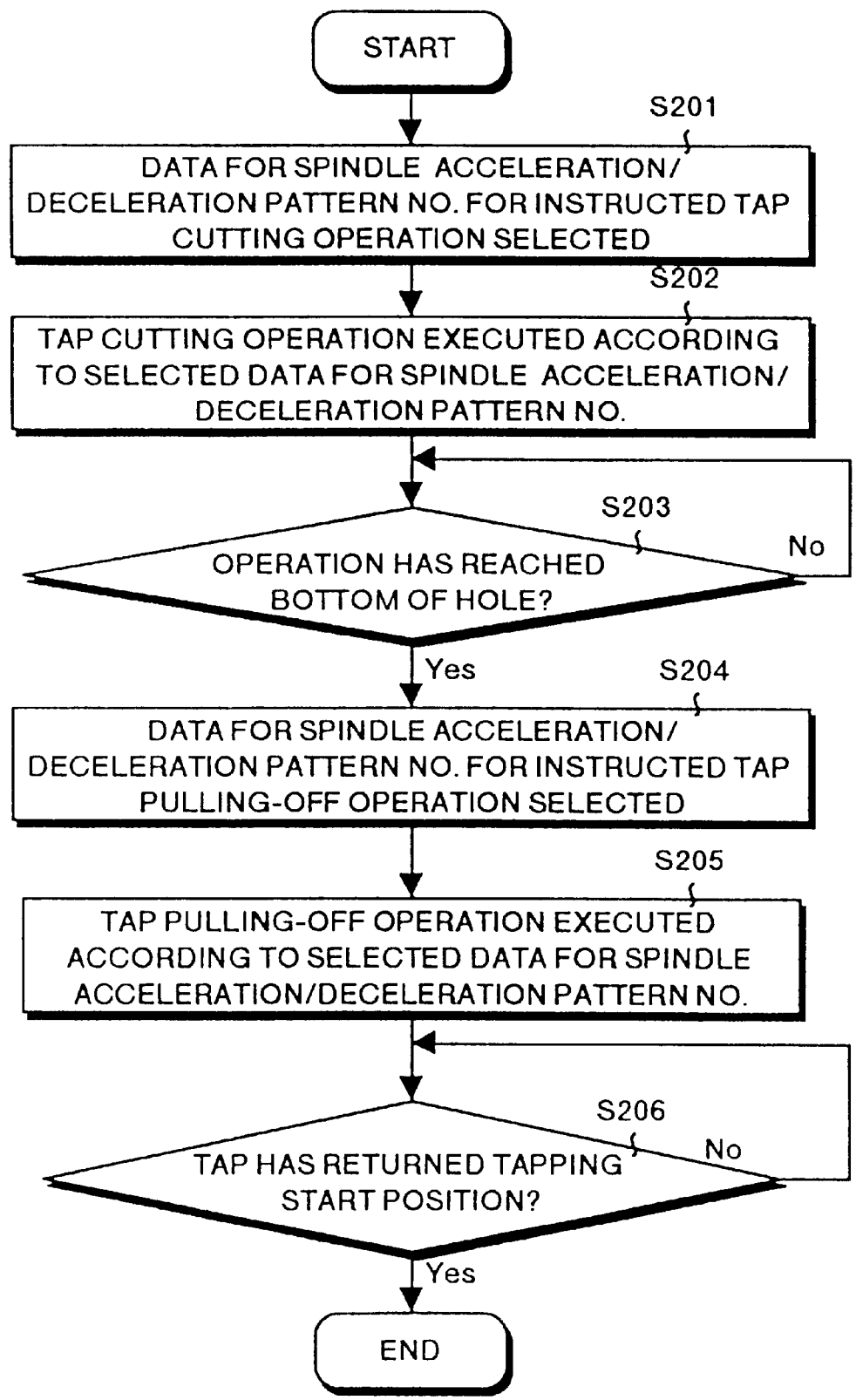
FIG. 17 is a flow chart showing processing for tapping operation in Embodiment 3.

FIG. 17 is a flow chart showing tapping in the embodiment, and description is made for the tapping operation with reference to the spindle acceleration/deceleration pattern data groups stored in the spindle acceleration/deceleration pattern data storing section 3 shown in FIG. 14, the tapping program shown in FIG. 15 in which the spindle acceleration/deceleration pattern number for a tap cutting operation and the spindle acceleration/deceleration pattern number for a tap pulling-off operation are instructed, and the acceleration/deceleration output instruction from the spindle acceleration/deceleration control section 4 shown in FIG. 16.

At first, the spindle acceleration/deceleration pattern data selecting section 8 selects spindle acceleration/deceleration pattern data for the spindle acceleration/deceleration pattern number for tap cutting operation instructed by the tapping program P from the spindle acceleration/deceleration pattern data storing section 3 (step S201). In the program for tapping shown in FIG. 15, indicated is that a spindle acceleration/deceleration pattern number is 1, so that spindle acceleration/deceleration pattern data for the spindle acceleration/deceleration pattern No. 1 shown in FIG. 14 is selected.

Then, processing of the instruction for tap cutting operation indicated by the reference numeral ① shown in FIG. 16 is executed according to the machining data instructed by the tapping program as well as to the spindle acceleration/deceleration pattern data for the spindle acceleration/deceleration pattern No. 1 selected in the previous step (step S202).

Then, determination is made as to whether the tap cutting has reached the bottom of a hole or not (step S203), and if it is not determined that the tap cutting has reached the bottom thereof, the processing of the instruction for tap cutting operation is continued, and the operation in step S203 is executed again.

In contrast, when it is determined that the tap cutting has reached the bottom of the hole, the processing of the instruction for tap cutting operation is finished, and then the spindle acceleration/deceleration pattern data selecting section 8 selects spindle acceleration/deceleration pattern data for the spindle acceleration/deceleration pattern number for the tap pulling-off operation instructed by the tapping program from the spindle acceleration/deceleration pattern data storing section 3 (step S204). In the tapping program shown in FIG. 15, indicated is that a spindle acceleration/ deceleration pattern number for a tap pulling-off operation is 4, so that spindle acceleration/deceleration pattern data for the spindle acceleration/deceleration pattern No. 4 is selected.

Then, the processing of instruction for tap pulling-off operation indicated by the reference numeral ④ shown in FIG. 16 is executed according to the machining data instructed by the tapping program as well as to the spindle acceleration/deceleration pattern data for the spindle acceleration/deceleration pattern No. 4 selected in the previous step (step S205).

Then, determination is made as to whether the tap has returned to the starting position of tapping or not (step S206), and if it is determined that the tap has returned to the tapping start position, the operation for tapping is finished. If it is not determined that the tap has returned to the tapping start position, processing of instructing the tap pulling-off operation is continued, and the operation in step S206 is executed again.

As a result of the operation described above, the spindle motor in the position loop control state can not only be controlled with an acceleration/deceleration pattern similar to that for the spindle motor in the velocity loop control state, but also can be controlled according to an optimal acceleration/deceleration pattern for a tap cutting operation as well as for a tap pulling-off operation selected from the plurality types of spindle acceleration/deceleration pattern data group.

With the operation described above, response capability of a spindle motor is improved in the optimal state during the tap cutting operation and during the tap pulling-off operation respectively, and a cycle time required for tapping is made shorter, so that even in a case where a method of making a slope of acceleration/deceleration larger is used, tapping can efficiently be executed, and a cycle time required for tapping can be made shorter.

The operation is controlled according to optimal acceleration/deceleration pattern data for a tap cutting operation and for a tap pulling-off operation selected from the plurality types of spindle acceleration/deceleration pattern data group, so that, if a spindle rotational speed for a tap cutting operation is instructed from the tapping program and that for a tap pulling-off operation is instructed therefrom discretely, the tapping can further efficiently be executed, and a cycle time required for tapping can be made shorter.

Figure 18:
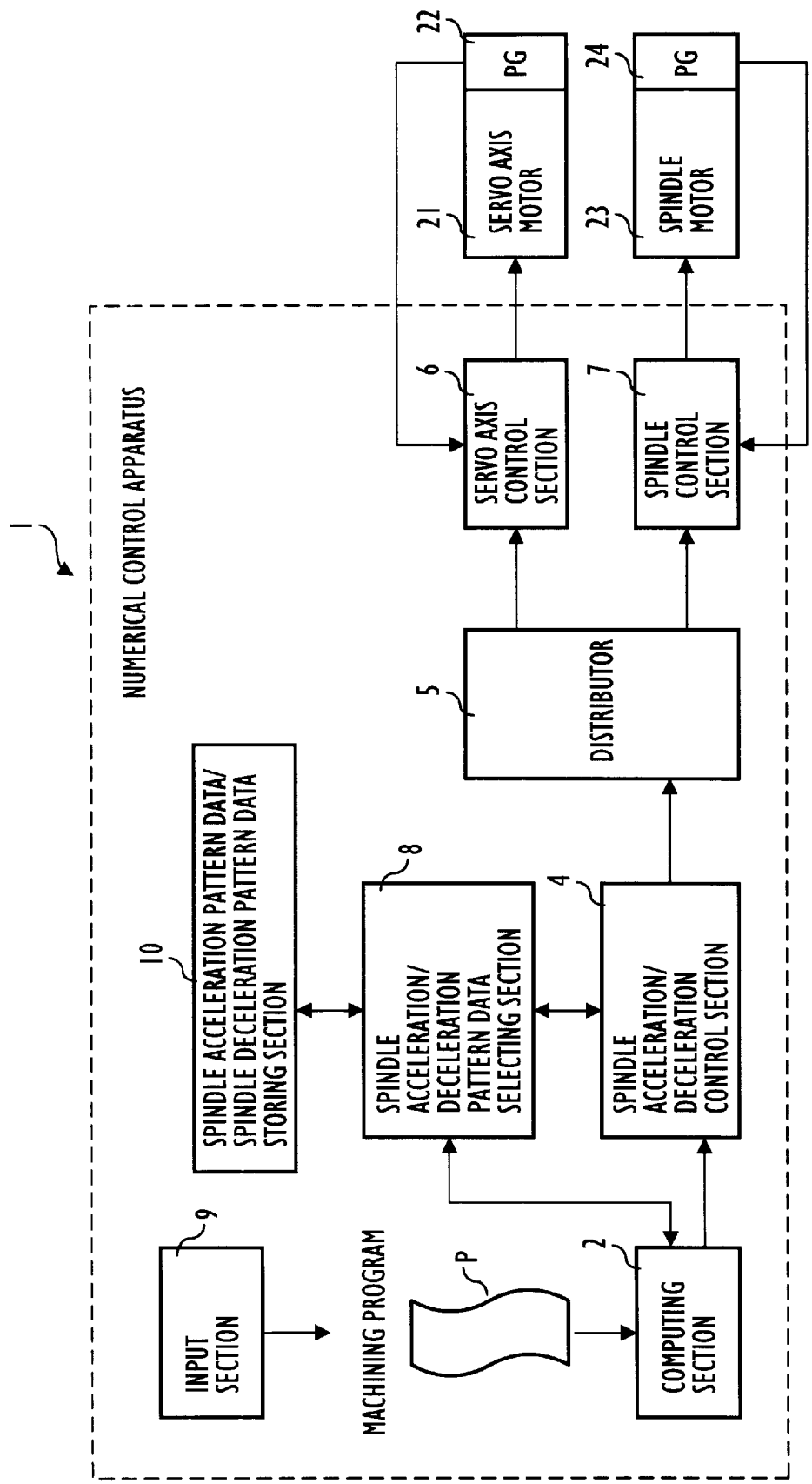
FIG. 18 is a block diagram showing key configuration of the numerical control apparatus according to Embodiment 4 of the present invention.

FIG. 18 shows the numerical control apparatus according to Embodiment 4 of the present invention. It should be noted that, in FIG. 18, the same reference numerals are assigned to the sections corresponding to those in FIG. 1, FIG. 9, and FIG. 13, and description thereof is omitted herein.

In the embodiment, a data storing section for a spindle acceleration pattern and a spindle deceleration pattern (a spindle acceleration/deceleration data storing section) 10 is provided therein. The spindle acceleration pattern data/spindle deceleration pattern data storing section 10 stores therein a plurality types of spindle acceleration pattern data for controlling the spindle motor 23 in the position loop control state with an acceleration pattern similar to an acceleration pattern for the spindle motor in the velocity loop control state, and a plurality types of spindle deceleration pattern data for controlling the spindle motor 23 in the position loop control state with a deceleration pattern similar to a deceleration pattern for the spindle motor in the velocity loop control state respectively.

The spindle acceleration/deceleration pattern data selecting section 8 selects spindle acceleration pattern data for processing of acceleration instruction and spindle deceleration pattern data for processing of deceleration instruction respectively each instructed from a plurality types of data stored in the spindle acceleration pattern data/spindle deceleration pattern data storing section 10.

The spindle acceleration/deceleration control section 4 computes an instruction for controlling the spindle motor 23 in the position loop control state with an acceleration pattern and a deceleration pattern discretely similar to an acceleration/deceleration pattern for the spindle motor in the velocity loop control state according to the spindle acceleration pattern data and the spindle deceleration pattern data selected by the spindle acceleration/deceleration pattern data selecting section 8.

FIG. 19 shows an example of storing the plurality types of spindle acceleration/deceleration pattern data in the spindle acceleration pattern data/spindle deceleration pattern data storing section 10. In this example, two types, No. 1 and No. 2, of spindle acceleration pattern data and two types, No. 1 and No. 2, of spindle deceleration pattern data are stored in the spindle acceleration pattern data/spindle deceleration pattern data storing section 10.

The spindle acceleration pattern data for the spindle acceleration pattern No. 1 comprises an acceleration time constant $Ta11$ for the first stage, an acceleration time constant $Ta12$ for the second stage, an acceleration time constant $Ta13$ for the third stage, an acceleration time constant $Ta14$ for the fourth stage, a spindle rotational speed $SPDa11$ for the first stage, a spindle rotational speed $SPDa12$ for the second stage, a spindle rotational speed $SPDa13$ for the third stage, and a spindle rotational speed $SPDa14$ for the fourth stage; and the spindle deceleration pattern data for the spindle deceleration pattern No. 1 comprises a deceleration time constant $Td11$ for the first stage, a deceleration time constant $Td12$ for the second stage, a deceleration time constant $Td13$ for the third stage, a spindle rotational speed $SPDd11$ for the first stage, a spindle rotational speed $SPDd12$ for the second stage, and a spindle rotational speed $SPDd13$ for the third stage; and both of the data are paired with each other with the same pattern number.

The spindle acceleration pattern data for the spindle acceleration pattern No. 2 comprises an acceleration time constant $Ta21$ for the first stage, an acceleration time constant $Ta22$ for the second stage, an acceleration time constant $Ta23$ for the third stage, an acceleration time constant $Ta24$ for the fourth stage, a spindle rotational speed $SPDa21$ for the first stage, a spindle rotational speed $SPDa22$ for the second stage, a spindle rotational speed $SPDa23$ for the third stage, and a spindle rotational speed $SPDa24$ for the fourth stage; and the spindle deceleration pattern data for the spindle deceleration pattern No. 2 comprises a deceleration time constant $Td21$ for the first stage, a deceleration time constant $Td22$ for the second stage, a deceleration time constant $Td23$ for the third stage, a spindle rotational speed $SPDd21$ for the first stage, a spindle rotational speed $SPDd22$ for the second stage, and a spindle rotational speed $SPDd23$ for the third stage; and both of the data are also paired with each other with the same pattern number.

In each of the spindle acceleration pattern data groups, the acceleration time constant $Ta11$, $Ta21$ for the first stage and the spindle rotational speed $SPDa11$, $SPDa21$ for the first stage are the spindle acceleration pattern data for deciding a slope of acceleration for the first stage; the acceleration time constant $Ta12$, $Ta22$ for the second stage and the spindle rotational speed $SPDa12$, $SPDa22$ for the second stage are the spindle acceleration pattern data for deciding a slope of acceleration for the second stage; the acceleration time constant Ta13, Ta23 for the third stage and the spindle rotational speed SPDa13, SPDa23 for the third stage are the spindle acceleration pattern data for deciding a slope of acceleration for the third stage; and the acceleration time constant Ta14, Ta24 for the fourth stage and the spindle rotational speed SPDa14, SPDa24 for the fourth stage are the spindle acceleration pattern data for deciding a slope of acceleration for the fourth stage.

The deceleration time constant Td11, Td21 for the first stage and the spindle rotational speed SPDd11, SPDd21 for the first stage are the spindle deceleration pattern data for deciding a slope of deceleration for the first stage; the deceleration time constant Td12, Td22 for the second stage and the spindle rotational speed SPDd12, SPDd22 for the second stage are the spindle deceleration pattern data for deciding a slope of deceleration for the second stage; and the deceleration time constant Td13, Td23 for the third stage and the spindle rotational speed SPDd13, SPDd23 for the third stage are the spindle deceleration pattern data for deciding a slope of deceleration for the third stage.

Figure 20:
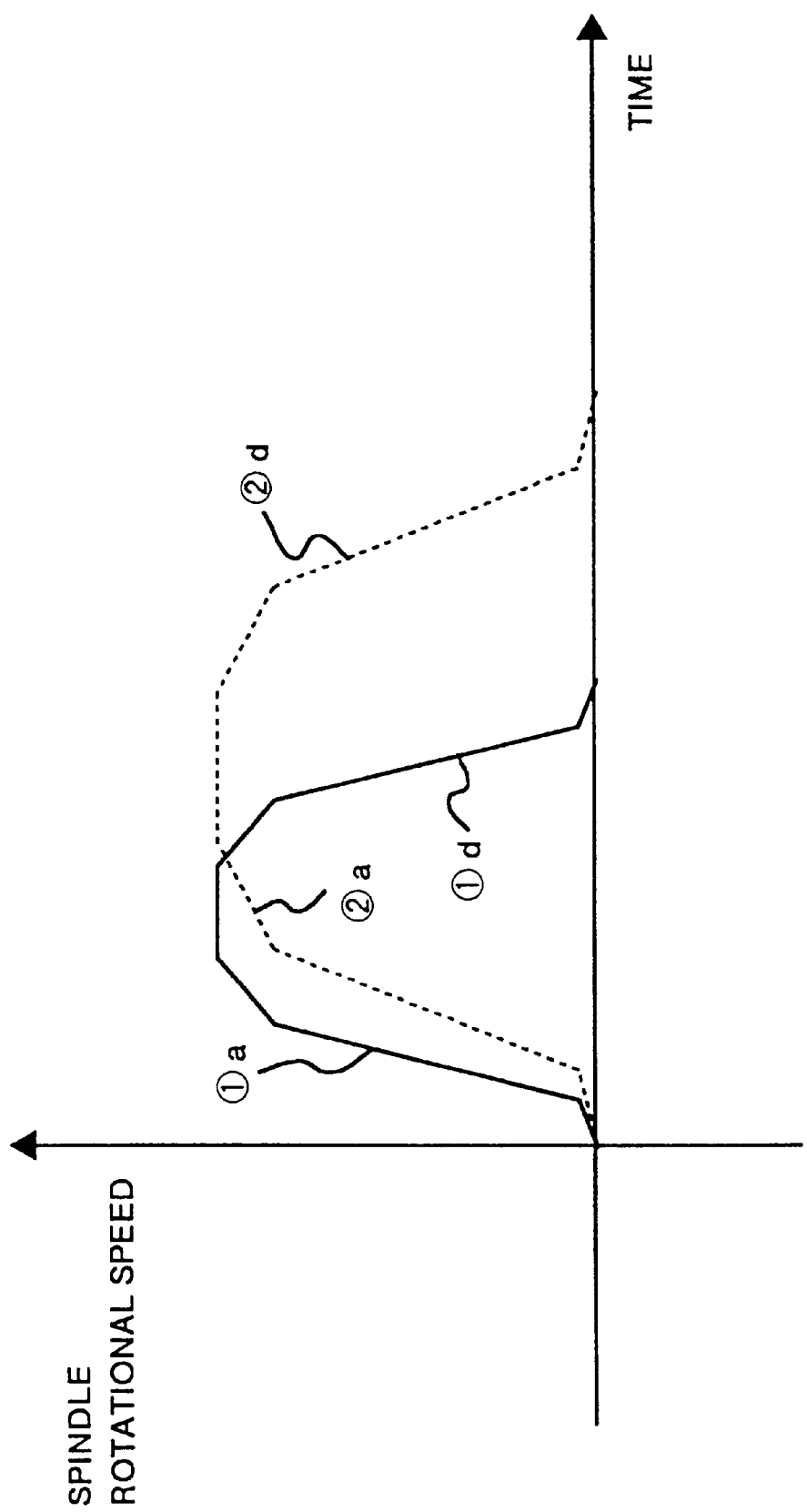
FIG. 20 is a graph showing an example of an output instruction for tapping operations in Embodiment 4.

FIG. 20 shows an example of output instructions for a tapping operation in the spindle acceleration/deceleration control section 4 in Embodiment 4. In FIG. 20, designated at the reference numeral ①a is an acceleration output instruction according to the spindle acceleration pattern data for the spindle acceleration pattern No. 1 stored in the spindle acceleration pattern data/spindle deceleration pattern data storing section 10, and at ①d a deceleration output instruction according to the spindle deceleration pattern data for the spindle deceleration pattern No. 1 stored in the spindle acceleration pattern data/spindle deceleration pattern data storing section 10.

The reference numeral ②a indicates an acceleration output instruction according to the spindle acceleration pattern data for the spindle acceleration pattern No. 2 stored in the spindle acceleration pattern data/spindle deceleration pattern data storing section 10, and the reference numeral ②d indicates a deceleration output instruction according to the spindle deceleration pattern data for the spindle deceleration pattern No. 2 stored in the spindle acceleration pattern data/spindle deceleration pattern data storing section 10.

In the acceleration output instructions ①a, ②a and the deceleration output instructions ①d, ②d, common spindle acceleration/deceleration pattern data between acceleration and deceleration is selected, and when acceleration output instruction and deceleration output instruction are executed according to the selected spindle acceleration/deceleration pattern data, a loss time is generated in a cycle time because inertia of a spindle during an operation for accelerating a spindle motor is different from inertia of the spindle during an operation for decelerating the spindle motor, so that the spindle acceleration pattern data is selected for acceleration, and the spindle deceleration pattern data is selected for deceleration, an acceleration output instruction or a deceleration output instruction is executed according to the selected spindle acceleration pattern data or to the selected spindle deceleration pattern data.

In this embodiment also, like in a case of Embodiment 3, a spindle acceleration pattern number for tap cutting operation and a spindle deceleration pattern number for tap pulling-off operation can be set in the machining program P by the input section 9.

Figure 21:
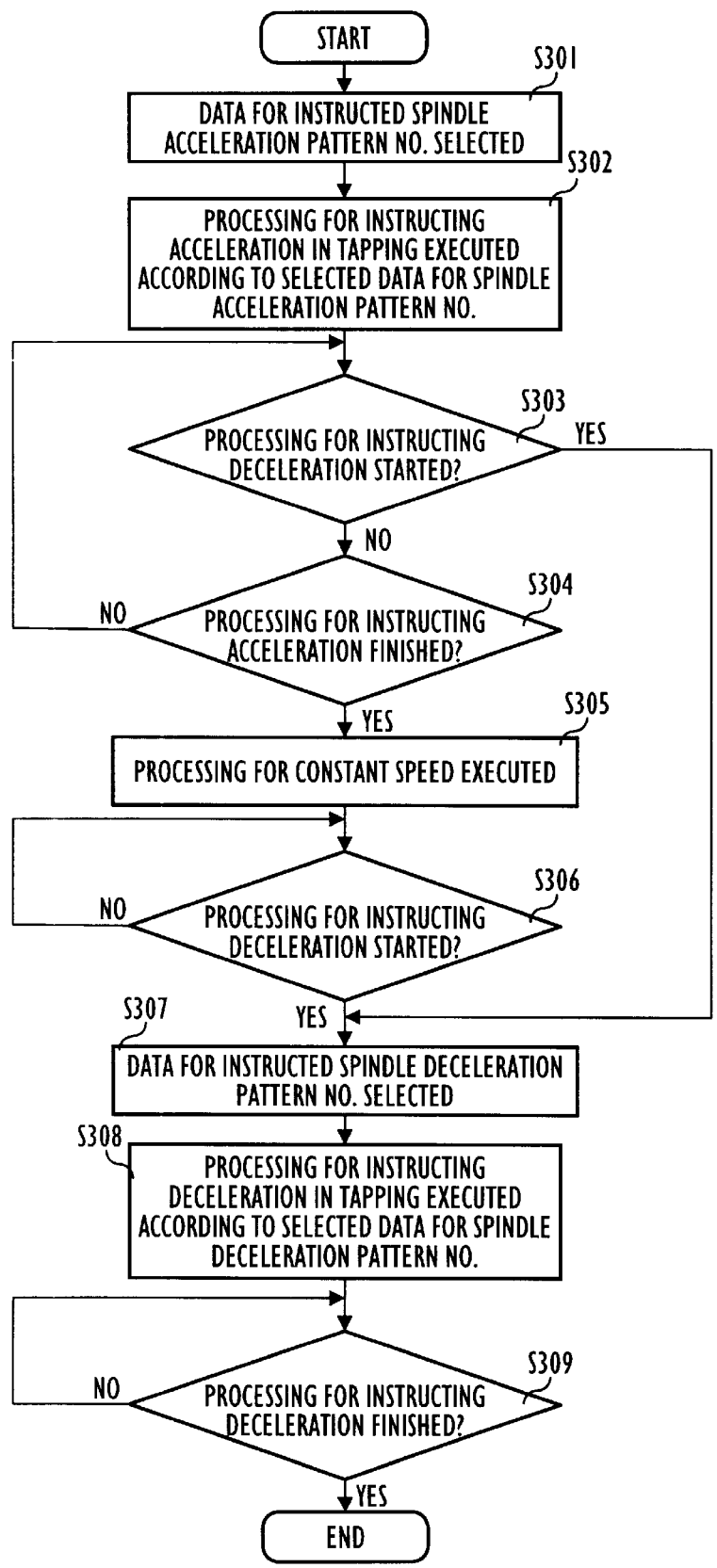
FIG. 21 is a flow chart showing processing for tapping operations in Embodiment 4.

FIG. 21 is a flow chart of tapping in the embodiment, and description is made for the tapping with reference to the spindle acceleration pattern data groups and the spindle deceleration pattern data groups each stored in the spindle acceleration pattern data/spindle deceleration pattern data storing section 10 shown in FIG. 19, and the acceleration output instruction and deceleration output instruction from the spindle acceleration/deceleration control section 4 shown in FIG. 20.

At first, the spindle acceleration/deceleration pattern data selecting section 8 selects spindle acceleration pattern data for the spindle acceleration pattern number instructed by the spindle acceleration pattern data/spindle deceleration pattern data storing section 10 (step S301). Herein, it is assumed that the spindle acceleration pattern data for the spindle acceleration pattern No. 1 shown in FIG. 19 is selected.

Then, the processing for instructing acceleration indicated by the reference numeral ①a shown in FIG. 20 is executed according to machining data instructed by the machining program P as well as to the spindle acceleration pattern data for the spindle acceleration pattern No. 1 selected in the previous step (step S302).

Then, determination is made as to whether processing for instructing deceleration is started or not (step S303), and when it is determined that the processing for instructing deceleration is to be started, the processing for instructing acceleration is finished, and system control shifts to step S307, while if it is not determined that the processing for instructing deceleration is to be started, the processing for instructing acceleration is continued, and then determination is made as to whether the processing for instructing acceleration is finished or not (step S304).

When it is determined that the processing for instructing acceleration is to be finished, the processing for instructing acceleration is finished, and processing for instructing constant speed according to machining data instructed by the machining program P (step S305). In contrast, if it is not determined that the processing for instructing acceleration is to be finished, the processing for instructing acceleration is continued, and system control returns to step S303.

After the processing for instructing constant speed is executed, determination is made as to whether processing for instructing deceleration is to be started or not (step S306), and if it is not determined that the processing for instructing deceleration is to be started, the processing for instructing constant speed is continued, and the operation in step S306 is executed again.

In contrast, if it is determined that the processing for instructing deceleration is to be started, the processing for instructing constant speed is finished, and the spindle acceleration/deceleration pattern data selecting section 8 selects spindle deceleration pattern data for the spindle deceleration pattern number instructed by the spindle acceleration pattern data/spindle deceleration pattern data storing section 10 (step S307). Herein, it is assumed that the spindle deceleration pattern data for the spindle deceleration pattern No. 1 shown in FIG. 19 is selected.

Then, the processing for instructing deceleration indicated by the reference numeral ①d shown in FIG. 20 is executed according to machining data instructed by the machining program P as well as to the spindle deceleration pattern data for the spindle deceleration pattern No. 1 selected in the previous step (step S308).

Then, determination is made as to whether the processing for instructing deceleration is finished or not (step S309), and when it is determined that the processing for instructing deceleration is to be finished, the processing for instructing deceleration is finished. If it is not determined that the processing for instructing deceleration is to be finished, the processing for instructing deceleration is continued, and the operation in step S309 is executed again.

As a result of the operation described above, the spindle motor 23 in the position loop control state can not only be controlled with an acceleration/deceleration pattern similar to that for the spindle motor in the velocity loop control state, but also can be controlled with optimal acceleration pattern data/deceleration pattern for the processing for instructing acceleration as well as for the processing for instructing deceleration selected from the plurality types of spindle acceleration pattern data group and of spindle deceleration pattern data group.

With the operation described above, even in a case where inertia of the spindle during the operation for accelerating the spindle motor is different from that during the operation for decelerating the spindle motor, response capability of a spindle motor is improved in an optimal state during acceleration and during deceleration respectively, and tapping can be executed with an optimal acceleration pattern and a deceleration pattern, and for this reason it is possible to prevent generation of a loss time in a cycle time required for tapping.

Figure 22:
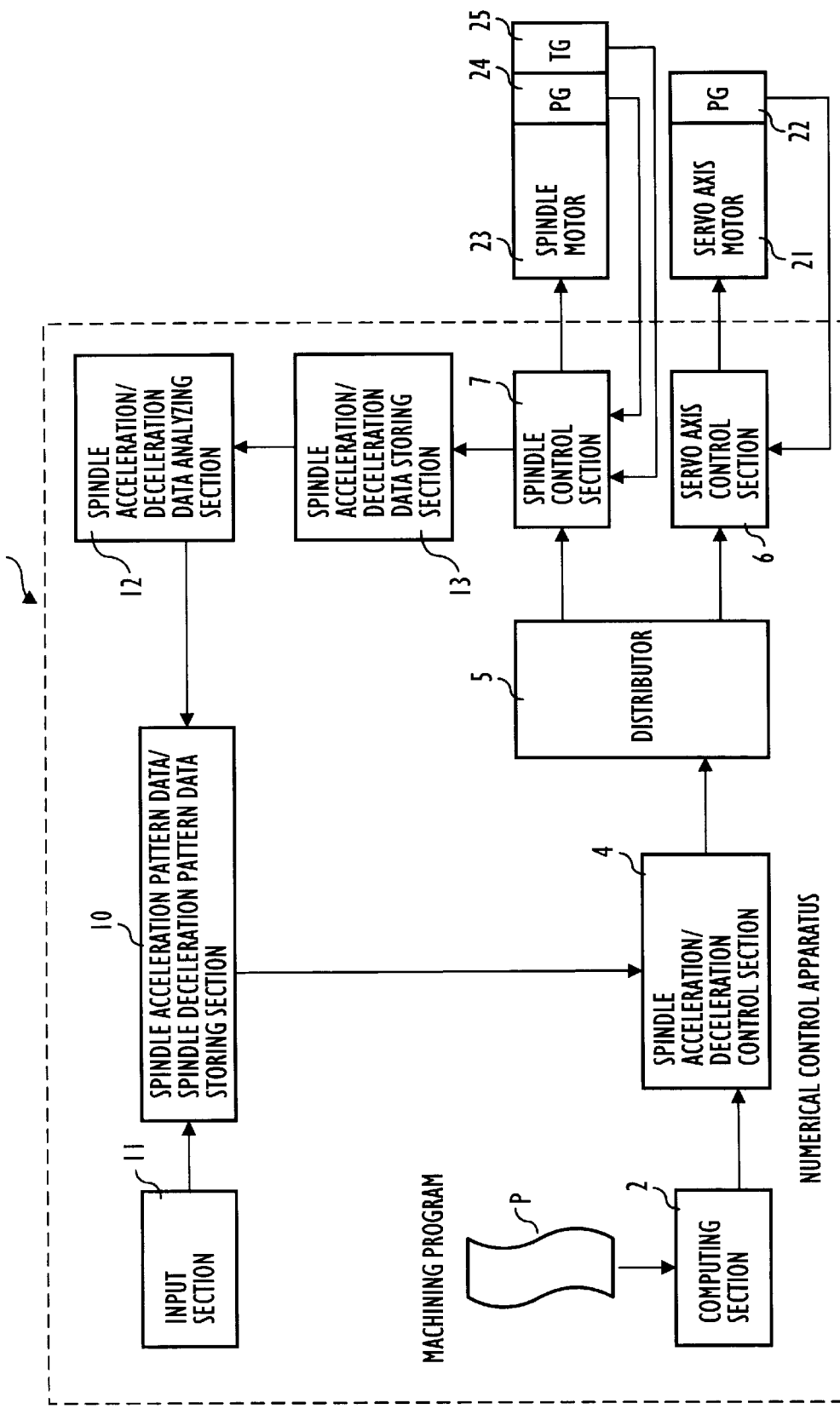
FIG. 22 is a block diagram showing key configuration of the numerical control apparatus according to Embodiment 5 of the present invention.

FIG. 22 shows the numerical control apparatus according to Embodiment 5 of the present invention. It should be noted that, in FIG. 2, the same reference numerals are assigned to the sections corresponding to those in FIG. 1, and description thereof is omitted herein.

In this embodiment, setting of spindle acceleration pattern data and spindle deceleration pattern in the spindle acceleration pattern data/spindle deceleration pattern data storing section 10 can automatically be executed by means of data transfer from a spindle acceleration/deceleration data analyzing section 12 in addition to data entry by an operator from the input section 11.

For this reason, in the embodiment, there is provided therein a spindle acceleration/deceleration data storing section 13 for storing acceleration data and deceleration data for the spindle motor 23 when the spindle control section 7 controls the spindle motor 23 in the velocity loop control state according to a speed signal from a speed sensor (TG) 25 in the spindle motor 23.

The spindle acceleration/deceleration data analyzing section 12 analyzes spindle acceleration or deceleration data stored in the spindle acceleration/deceleration data storing section 13, generates spindle acceleration/deceleration pattern data for controlling a spindle motor 23 in the position loop control state with an acceleration pattern or a deceleration pattern each similar to an acceleration or deceleration pattern for the spindle motor in the velocity loop control state, and sets the generated data in the spindle acceleration pattern data/spindle deceleration pattern data storing section 10.

Figure 23:
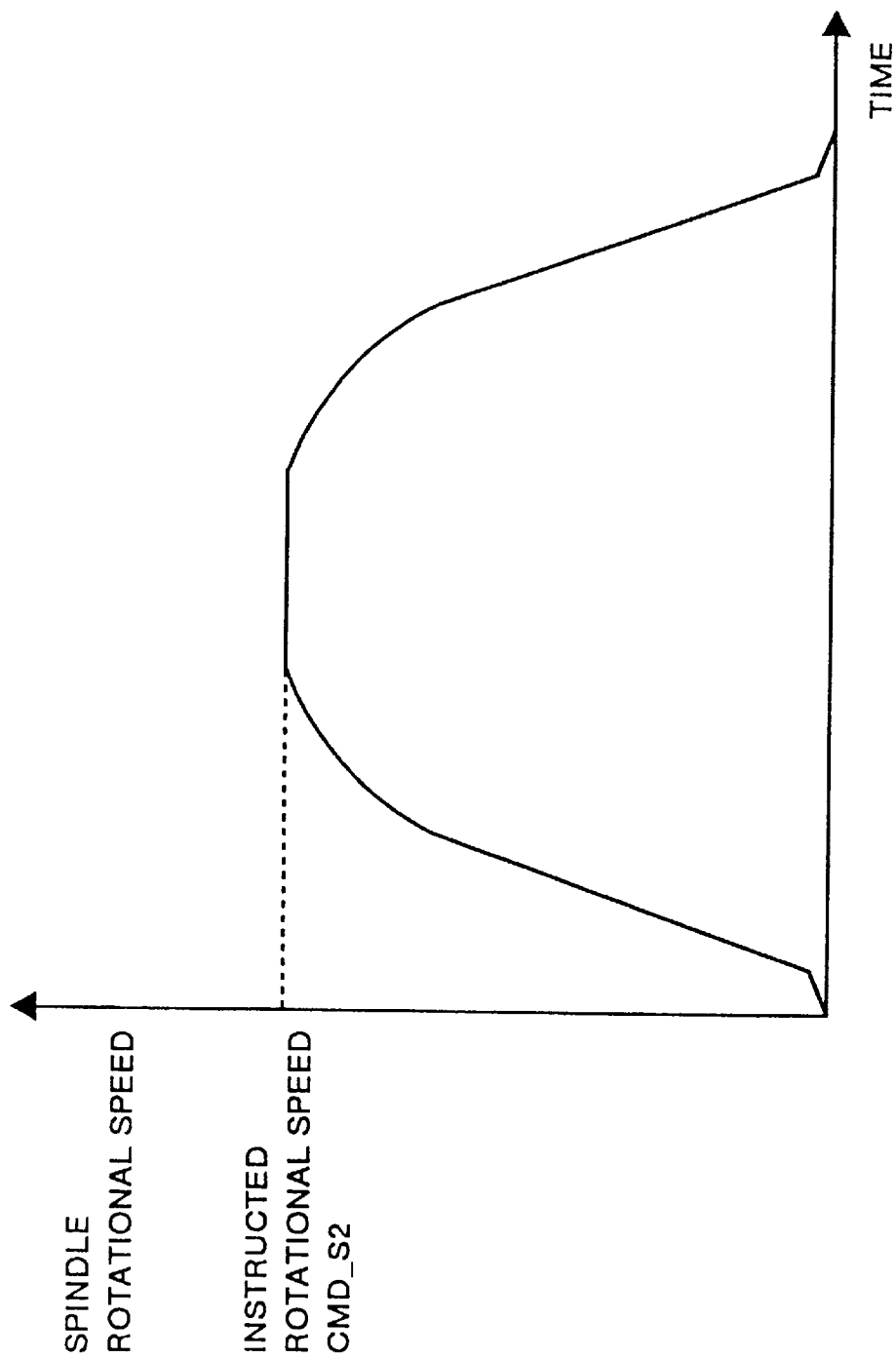
FIG. 23 is a graph for characteristics showing an example of acceleration/deceleration characteristics for the spindle motor in the velocity loop control state.

FIG. 23 shows an example of acceleration/deceleration data for the spindle motor 23 in the velocity loop control state. FIG. 23 shows acceleration data until a rotational speed of the spindle motor 23 reaches the instructed rotational speed CMD_S2 and deceleration data until the spindle motor 23 stops from the instructed rotational speed CMD_S2.

Loose acceleration of the spindle motor 23 is executed when acceleration is started from the stopped state, and then acceleration is continued with a substantially constant slope. When a rotational speed of the spindle motor 23 gets close to the instructed rotational speed CMD_S2, again loose acceleration is executed, and when a rotational speed of the spindle motor has reached the instructed rotational speed CMD_S2, rotation with a constant speed is executed.

The spindle motor 23, when stopping is instructed, executes loose deceleration from the rotation with a constant speed, and then deceleration is continued with a substantially constant slope. When a rotational speed of the spindle motor 23 gets close to the instructed rotational speed CMD_S2, again loose deceleration is executed, and the rotation is stopped.

FIG. 24 shows an example of storing the spindle acceleration/deceleration pattern data in the spindle acceleration pattern data/spindle deceleration pattern data storing section 10.

The spindle acceleration pattern data comprises an acceleration time constant Ta1 for the first stage, an acceleration time constant Ta2 for the second stage, an acceleration time constant Ta3 for the third stage, an acceleration time constant Ta4 for the fourth stage, a spindle rotational speed SPDa1 for the first stage, a spindle rotational speed SPDa2 for the second stage, a spindle rotational speed SPDa3 for the third stage, and a spindle rotational speed SPDa4 for the fourth stage; and the spindle deceleration pattern data comprises a deceleration time constant Td1 for the first stage, a deceleration time constant Td4 for the fourth stage, a deceleration time constant Td2 for the second stage, a deceleration time constant Td3 for the third stage, a spindle rotational speed SPDd1 for the first stage, a spindle rotational speed SPDd2 for the second stage, a spindle rotational speed SPDd3 for the third stage; and a spindle rotational speed SPDd4 for the fourth stage.

In the spindle acceleration pattern data, the acceleration time constant Ta1 for the first stage and the spindle rotational speed SPDa1 for the first stage are the spindle acceleration pattern data for deciding a slope of acceleration for the first stage; the acceleration time constant Ta2 for the second stage and the spindle rotational speed SPDa2 for the second stage are the spindle acceleration pattern data for deciding a slope of acceleration for the second stage; the acceleration time constant Ta3 for the third stage and the spindle rotational speed SPDa3 for the third stage are the spindle acceleration pattern data for deciding a slope of acceleration for the third stage; and the acceleration time constant Ta4 for the fourth stage and the spindle rotational speed SPDa4 for the fourth stage are the spindle acceleration pattern data for deciding a slope of acceleration for the fourth stage.

The deceleration time constant Td1 for the first stage and the spindle rotational speed SPDd1 for the first stage are the spindle deceleration pattern data for deciding a slope of deceleration for the first stage; the deceleration time constant Td2 for the second stage and the spindle rotational speed SPDd2 for the second stage are the spindle deceleration pattern data for deciding a slope of deceleration for the second stage; the deceleration time constant Td3 for the third stage and the spindle rotational speed SPDd3 for the third stage are the spindle deceleration pattern data for deciding a slope of deceleration for the third stage; and the deceleration time constant Td4 for the fourth stage and the spindle rotational speed SPDd4 for the fourth stage are the spindle deceleration pattern data for deciding a slope of deceleration for the fourth stage.

Spindle acceleration pattern data and spindle deceleration pattern data can be set in the spindle acceleration pattern data/spindle deceleration pattern data storing section 10 by an operator who can input and set the data in a parameter setting form from the input section 11.

However, it is not only inefficient but also possible for an operator to erroneously set therein if the operator sets spindle acceleration pattern data and spindle deceleration pattern data each suitable for machining conditions and mechanical conditions from the input section 11.

For this reason, in the embodiment, an operator can automatically set spindle acceleration pattern data and spindle deceleration pattern data in the spindle acceleration pattern data/spindle deceleration pattern data storing section 10 only by rotating and driving the spindle motor 23 in the velocity loop control state from the stopped state up to the state of constant speed rotation as well as by stopping the spindle motor 23 in the velocity loop control state from the state of constant speed rotation.

An operator switches the mode to the spindle acceleration/deceleration pattern data setting mode with the input section 11 and has the spindle motor 23 in the velocity loop control state rotated and driven from the stopped state up to the state of constant speed rotation after a number of changed points for spindle acceleration/deceleration data is set from the input section 11. The operator checks that acceleration of the spindle motor 23 has reached the speed for constant speed rotation, and then stops the spindle motor 23. With this operation, the spindle acceleration/deceleration data storing section 13 stores therein acceleration/deceleration data for the spindle motor 23 in the velocity loop control state.

Figure 25:
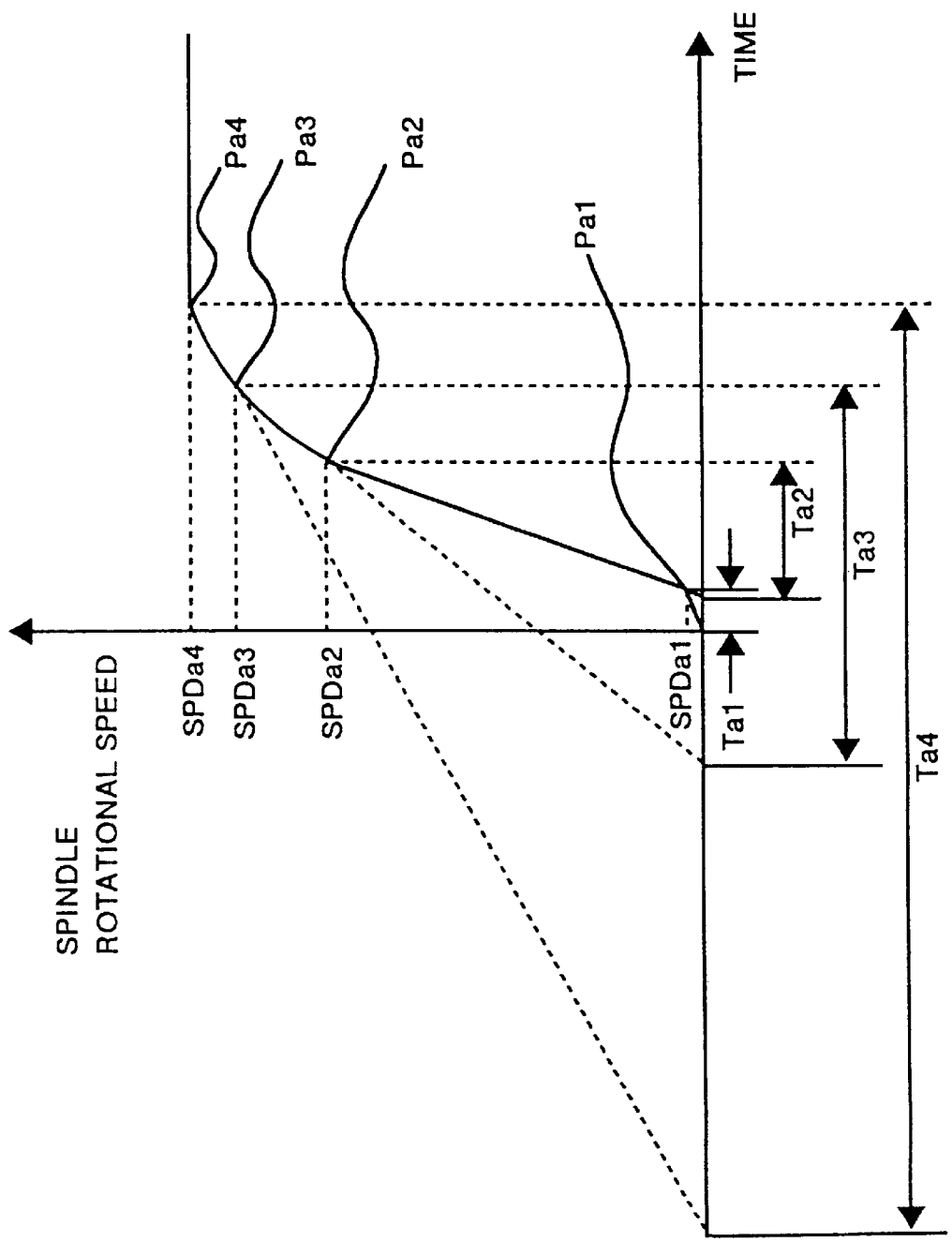
FIG. 25 is an explanatory view showing an example of computing spindle acceleration pattern data in Embodiment 5.

FIG. 25 shows an example in which the spindle acceleration/deceleration data analyzing section 12 computes the spindle acceleration pattern data according to acceleration data for the spindle motor 23 in the velocity loop control state stored in the spindle acceleration/deceleration data storing section 13, and sets the computed data in the spindle acceleration pattern data/spindle deceleration pattern data storing section 10.

In the acceleration data for the spindle motor 23 in the velocity loop control state shown in FIG. 25, designated at the reference numeral Pa1 is an acceleration data changed point for the first stage, at Pa2 an acceleration data changed point for the second stage, at Pa3 an acceleration data changed point for the third stage, and at Pa4 an acceleration data changed point for the fourth stage, and these points described above indicate remarkably changed points for acceleration data for the spindle motor 23 in the velocity loop control state.

In the FIG. 25, designated at the reference numeral Ta1 is an acceleration time constant for the first stage in a slope of acceleration data in a range from a point of time when a rotational speed of the spindle motor 23 is zero (stopped state) up to a point of time when the rotational speed thereof reaches the acceleration data changed point Pa1 for the first stage, at Ta2 an acceleration time constant for the second stage in a slope of acceleration data in a range from the acceleration data changed point Pa1 for the first stage up to a point of time when the rotational speed thereof reaches the acceleration data changed point Pa2 for the second stage, at Ta3 an acceleration time constant for the third stage in a slope of acceleration data in a range from the acceleration data changed point Pa2 for the second stage up to a point of time when the rotational speed thereof reaches the acceleration data changed point Pa3 for the third stage, and at Ta4 an acceleration time constant for the fourth stage in a slope of acceleration data in a range from the acceleration data changed point Pa3 for the third stage up to a point of time when the rotational speed thereof reaches the acceleration data changed point Pa4 for the second stage.

In the FIG. 25, designated at the reference numeral SPDa1 is a spindle rotational speed for the first stage at the acceleration data changed point Pa1 for the first stage, at SPDa2 a spindle rotational speed for the second stage at the acceleration data changed point Pa2 for the second stage, at SPDa3 a spindle rotational speed for the third stage at the acceleration data changed point Pa3 for the third stage, and at SPDa4 a spindle rotational speed for the fourth stage at the acceleration data changed point Pa4 for the fourth stage.

As described above, the spindle acceleration/deceleration data analyzing section 12 analyzes acceleration data for the spindle motor 23 in the velocity loop control state stored in the spindle acceleration/deceleration data storing section 13, computes spindle acceleration pattern data for controlling the spindle motor 23 in the position loop control state with an acceleration pattern similar to an acceleration pattern for the spindle motor in the velocity loop control state according to the remarkably changed points Pa1 to Pa4 in the acceleration data, and sets the computed spindle acceleration pattern data in the spindle acceleration pattern data/spindle deceleration pattern data storing section 10.

Figure 26:
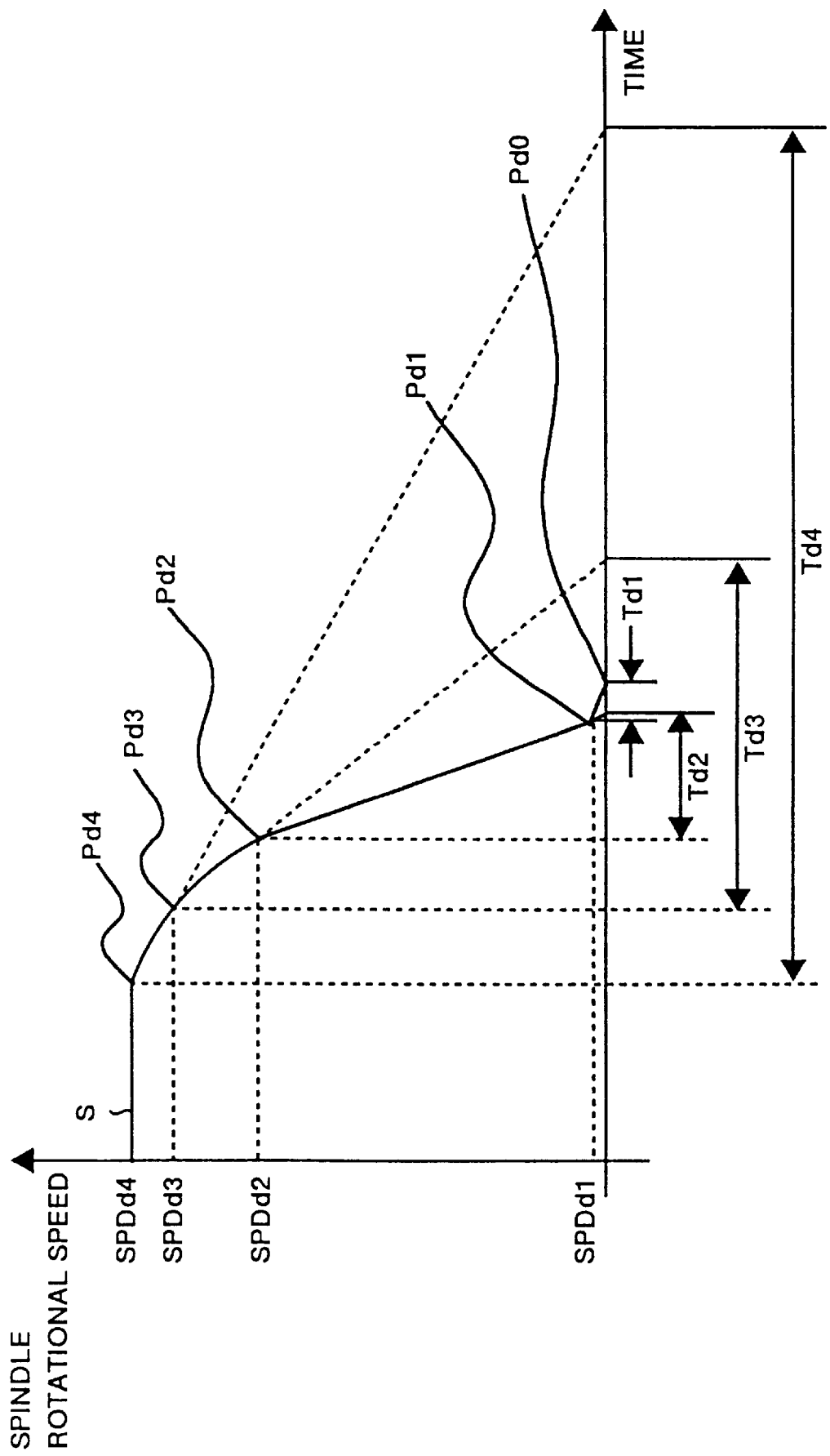
FIG. 26 is an explanatory view showing an example of computing spindle deceleration pattern data in Embodiment 5.

FIG. 26 shows an example in which the spindle acceleration/deceleration data analyzing section 12 computes spindle deceleration pattern data according to deceleration data for the spindle motor 23 in the velocity loop control state stored in the spindle acceleration/deceleration data storing section 13, and sets the computed data in the spindle acceleration pattern data/spindle deceleration pattern data storing section 10.

In the acceleration data for the spindle motor 23 in the velocity loop control state shown in FIG. 26, designated at the reference numeral Pd4 is a deceleration data changed point for the fourth stage at a point of time when deceleration of the spindle motor 23 is started from the constant speed rotation, at Pd3 a deceleration data changed point for the third stage, at Pd2 a deceleration data changed point for the second stage, at Pd1 a deceleration data changed point for the first stage, and at Pd0 a rotation stopped point, and these points described above indicate remarkably changed points for deceleration data for the spindle motor 23 in the velocity loop control state.

In the FIG. 26, designated at the reference numeral Td4 is a deceleration time constant for the fourth stage in a slope of deceleration data in a range from the deceleration data changed point for the fourth stage (the point when deceleration of the spindle motor 23 is started from the constant speed rotation) Pd4 up to a point of time when the rotational speed thereof reaches the deceleration data changed point Pd3 for the third stage, at Td3 a deceleration time constant for the third stage in a slope of deceleration data in a range from the deceleration data changed point Pd3 for the third stage up to a point of time when the rotational speed thereof reaches the deceleration data changed point Pd2 for the second stage, at Td2 a deceleration time constant for the second stage in a slope of deceleration data in a range from the deceleration data changed point Pd2 for the second stage up to a point of time when the rotational speed thereof reaches the deceleration data changed point Pd1 for the first stage, and at Td1 a deceleration time constant for the first stage in a slope of deceleration data in a range from the deceleration data changed point Pd1 for the first stage up to a point of time when the spindle motor 23 reaches the point Pd0 in which the rotation is stopped.

In the FIG. 26, designated at the reference numeral SPDd4 is a spindle rotational speed for the fourth stage at the deceleration data changed point Pd4 for the fourth stage, at SPDd3 a spindle rotational speed for the third stage at the deceleration data changed point Pd3 for the third stage, at SPDd2 a spindle rotational speed for the second stage at the deceleration data changed point Pd2 for the second stage, and at SPDd1 a spindle rotational speed for the first stage at the deceleration data changed point Pd1 for the first stage.

As described above, the spindle acceleration/deceleration data analyzing section 12 analyzes deceleration data for the spindle motor 23 in the velocity loop control state stored in the spindle acceleration/deceleration data storing section 13, computes spindle deceleration pattern data for controlling the spindle motor 23 in the position loop control state with a deceleration pattern similar to a deceleration pattern for the spindle motor in the velocity loop control state according to the remarkably changed points Pd1 to Pd4 in the deceleration data, and sets the computed spindle deceleration pattern data in the spindle acceleration pattern data/spindle deceleration pattern data storing section 10.

Figure 27:
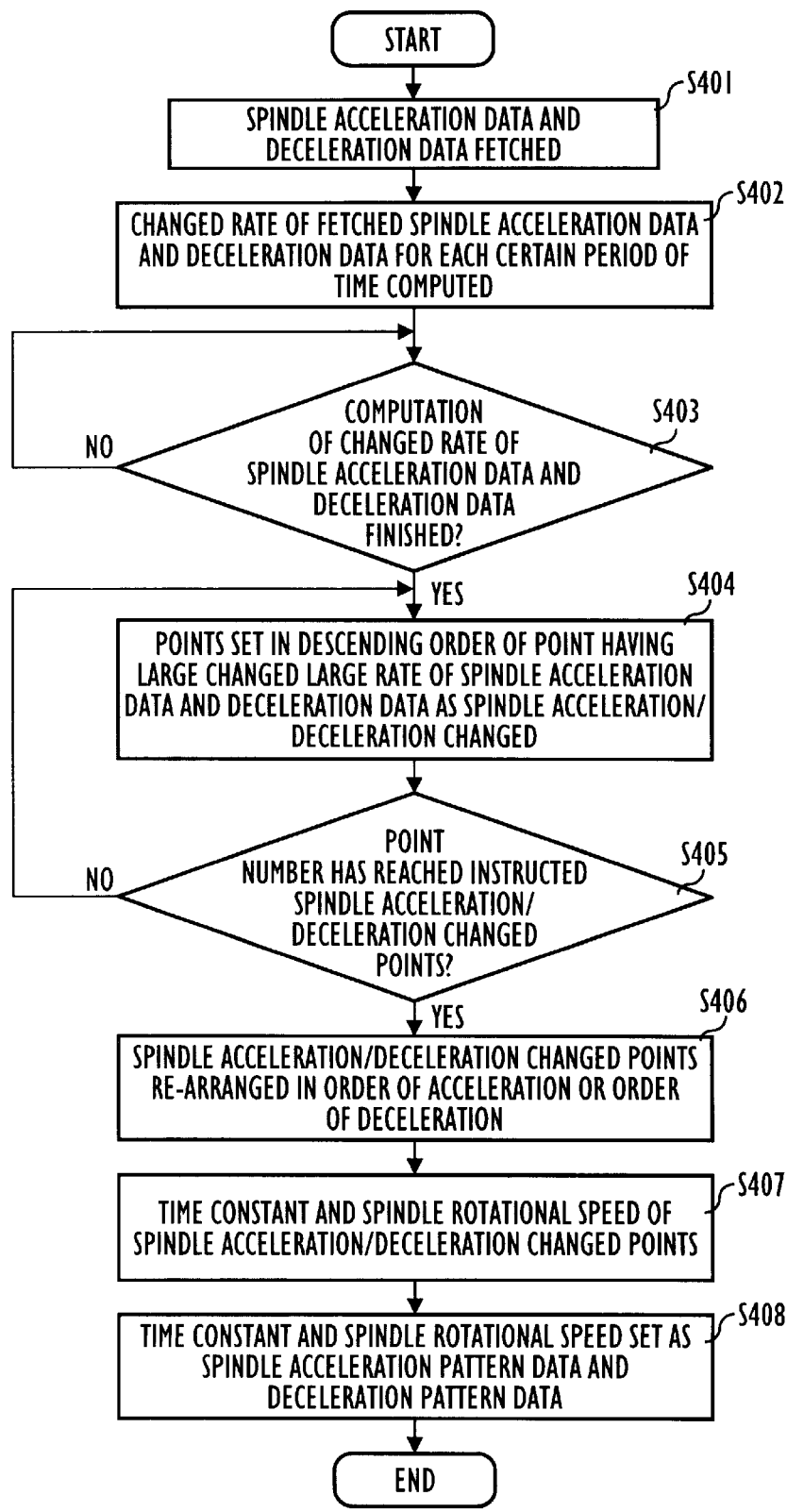
FIG. 27 is a flow chart showing processing for setting spindle acceleration/deceleration pattern data in Embodiment 5.
Figure 28:
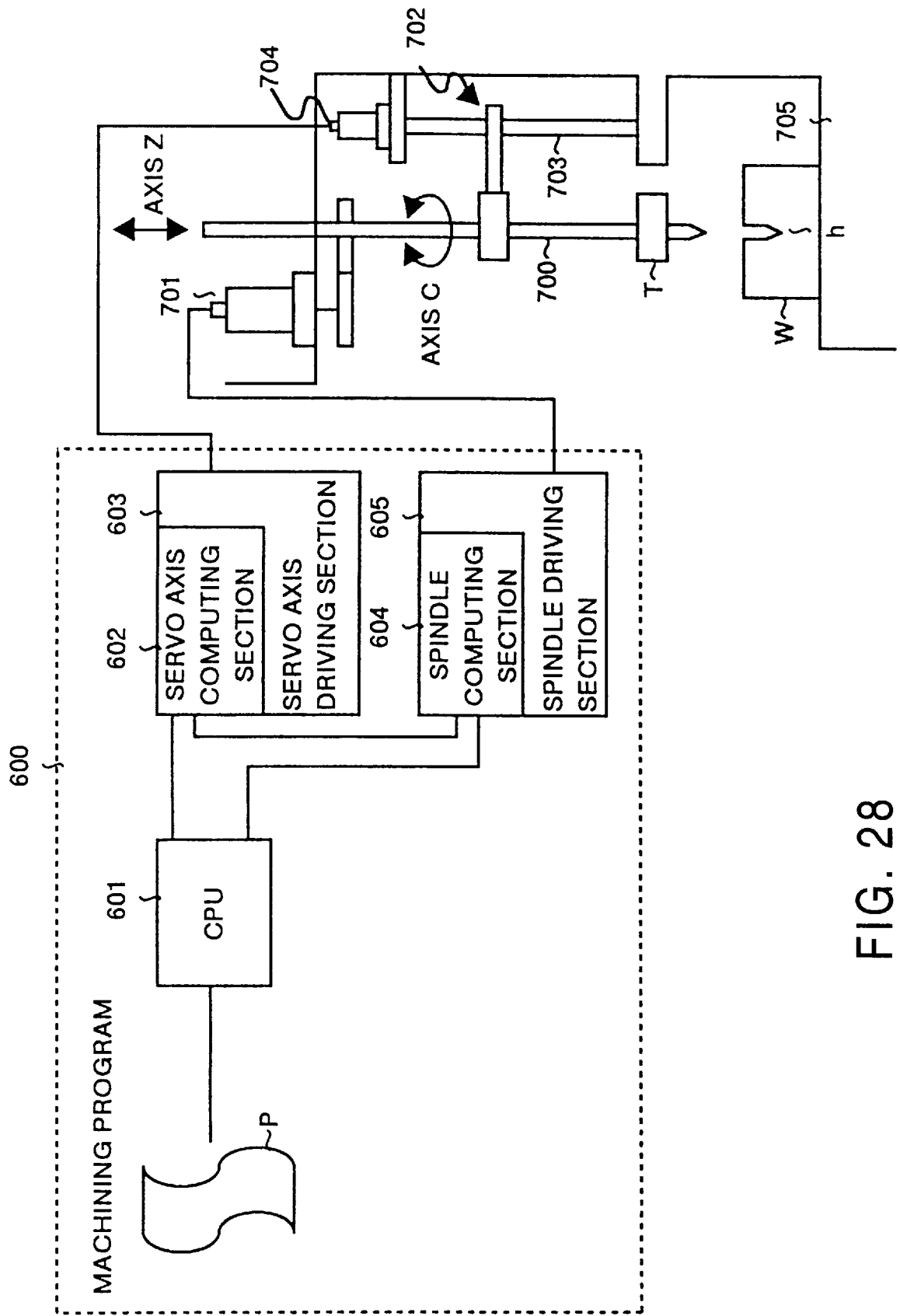
FIG. 28 is a block diagram showing configuration of a numerical control apparatus based on the conventional technology.

FIG. 27 is a flow chart of processing for setting spindle acceleration/deceleration pattern data.

At first, the spindle acceleration/deceleration data analyzing section 12 fetches thereinto acceleration data and deceleration data for the spindle motor 23 in the velocity loop control state written in the spindle acceleration/deceleration data storing section 13 (step S401). When fetching the acceleration data and deceleration data for the spindle motor 23 is finished, the spindle acceleration/deceleration data analyzing section 12 computes a changed rate of the fetched spindle acceleration data and deceleration data for each certain period of time (step S402).

Then determination is made as to whether computation of a changed rate of all the fetched spindle acceleration data and deceleration data for each certain period of time has been finished or not (step S403), and if the computation of the changed rate of all the fetched spindle acceleration data and deceleration data for each certain period of time has been finished, points are set in the descending order of a point having a larger changed rate of the spindle acceleration data and deceleration data respectively as spindle acceleration/deceleration changed points according to the changed rate of the spindle acceleration data and deceleration data (step S404).

Then, determination is made as to whether the set point number has reached the instructed spindle acceleration/deceleration changed point (step S405). If it is determined that it has not reached the instructed spindle acceleration/deceleration changed point, system control returns to step S404, and points are repeatedly set in the descending order of a point having a larger change rate of spindle acceleration data and deceleration data as spindle acceleration/deceleration changed points according to the changed rate of spindle acceleration data and deceleration data.

In contrast, if it is determined that it has reached the instructed spindle acceleration/deceleration changed point, spindle acceleration changed points in acceleration for the spindle motor 23 are re-arranged in the order thereof from the stopped state to the constant speed rotation, such as in the order of the acceleration data changed point Pa1 for the first stage, acceleration data changed point Pa2 for the second stage, acceleration data changed point Pa3 for the third stage, and acceleration data changed point Pa4 for the fourth stage, while spindle deceleration changed points in deceleration for the spindle motor 23 are re-arranged in the order thereof from the constant speed rotation to the stopped state, such as in the order of the deceleration data changed point Pd4 for the fourth stage, deceleration data changed point Pd3 for the third stage, deceleration data changed point Pd2 for the second stage, and deceleration data changed point Pd1 for the first stage (step S406).

Then, each of time constants and spindle rotational speeds of the spindle acceleration changed points Pa1 to Pa4 as well as of the spindle deceleration changed points Pd1 to Pd4 each re-arranged in the order of acceleration or deceleration in the previous step are computed according to the spindle acceleration data and deceleration data (step S407).

In the final step, a time constant and a spindle rotational speed for each of spindle acceleration/deceleration data changed points computed in the previous step are set in the spindle acceleration pattern data/spindle deceleration pattern data storing section 10.

As described above, an operator has only to operate for having a spindle motor 23 in the velocity loop control state rotated and driven from the stopped state and to make the spindle motor 23 in the velocity loop control state stop from constant speed rotation, whereby spindle acceleration/deceleration pattern data is automatically set in the spindle acceleration pattern data/spindle deceleration pattern data storing section 10 by the spindle acceleration/deceleration data storing section 13 and spindle acceleration/deceleration data analyzing section 12, so that a quantity of work for an operator can be reduced and also erroneous setting thereby can be prevented.

It should be noted that, in the description above, the spindle acceleration/deceleration data analyzing section 12 sets four points of spindle acceleration/deceleration data changed points in the spindle acceleration data as well as in the spindle deceleration data respectively, but a number of spindle acceleration/deceleration data changed points may be a plurality points thereof other than four points, and also the spindle acceleration/deceleration data analyzing section 12 sets four points of spindle acceleration/deceleration data changed points in the spindle acceleration data as well as in the spindle deceleration data respectively, but a number of the spindle acceleration data changed points is not necessarily identical to that of the spindle deceleration data changed points.

As understood from the description described above, with the numerical control apparatus according to the present invention, in a case where a method of making a slope of acceleration/deceleration (an acceleration) larger is used for making a cycle time required for tapping or the like shorter, the spindle acceleration/deceleration control means computes instructions for controlling a spindle motor in the position loop control state with acceleration/deceleration patterns similar to acceleration/deceleration patterns for a spindle motor in the velocity loop control state according to the acceleration/deceleration pattern data stored in the spindle acceleration/deceleration pattern data storing means, and a spindle motor in the position loop control state is controlled with acceleration/deceleration patterns similar to acceleration/deceleration patterns for a spindle motor in the velocity loop control state, whereby response capability of a spindle motor is improved, and even in a case where inertia in the spindle becomes larger as compared to that in the servo axis, a follow-up delay of the spindle motor from the servo axis motor does not easily occur at a point of time just before start of acceleration from the stopped state or just before end of acceleration (for just before start of constant speed rotation), or at a point of time just before start of deceleration from constant speed rotation or just before end of deceleration (start of stopped state), so that a cycle time required for tapping or the like can be made shorter and processing precision can also be improved.

With the numerical control apparatus according to another feature of the present invention, in a case where a method of making a slope of acceleration/deceleration (an acceleration) larger is used for making a cycle time required for tapping or the like shorter, the spindle acceleration/deceleration pattern data selecting means can select acceleration/deceleration patterns similar to acceleration/deceleration patterns for the spindle motor in the velocity loop control state suitable for a material of a work, a material of a tool, and a form thereof, and a spindle motor in the position loop control state is controlled according to the selected spindle acceleration/deceleration pattern data, whereby response capability of the spindle motor is precisely improved, so that instruction for acceleration/deceleration optimal for processing conditions of a spindle as well as of a servo axis can be executed, and tapping precision can be improved.

With the numerical control apparatus according to another feature of the present invention, in a case where a method of making a slope of acceleration/deceleration (an acceleration) larger is used for making a cycle time required for tapping shorter, the spindle acceleration/deceleration pattern data selecting means sets for selection acceleration/deceleration patterns similar to acceleration/deceleration patterns for the spindle motor in different velocity loop control states each suitable for tap cutting operation as well as for tap pulling-off operation, respectively, and the spindle motor in the position loop control state is controlled according to the selected and set spindle acceleration/deceleration pattern data, so that response capability of the spindle motor is improved in an optimal state during the tap cutting operation as well as during the tap pulling-off operation, respectively, which makes it possible to execute optimal instructions for acceleration/deceleration for tap cutting operation and tap pulling-off operation of a spindle as well as of a servo axis, and to make a cycle time required for tapping shorter.

With the numerical control apparatus according to another feature of the present invention, the spindle acceleration/deceleration pattern data is set for selection by means of analyzing data described in a machining program, so that selection of spindle acceleration/deceleration pattern data can easily be set on a machining program.

With the numerical control apparatus according to another feature of the present invention, acceleration/deceleration patterns similar to acceleration/deceleration patterns for the spindle motor in the different velocity loop control states each suitable for acceleration as well as for deceleration are set, and the spindle motor in the position loop control state is controlled according to the set spindle acceleration pattern data as well as to the set spindle deceleration pattern data, so that response capability of the spindle motor is improved in an optimal state during acceleration as well as during deceleration respectively, and an optimal instruction for acceleration and an optimal instruction for deceleration for machine conditions of a spindle and a servo axis can be executed, whereby the spindle motor can be controlled with optimal acceleration patterns and deceleration patterns so that it is possible not to generate a loss time in a cycle time even in a case where inertia in the spindle for acceleration is different from that in the spindle for deceleration.

With the numerical control apparatus according to another feature of the present invention, an operator rotates and drives a spindle motor in the velocity loop control state from the stopped state and stops the spindle motor in the velocity loop control state from the constant speed rotation state, whereby the spindle acceleration/deceleration data storing means and the spindle acceleration/deceleration data analyzing means automatically sets spindle acceleration/deceleration pattern data in the spindle acceleration/deceleration pattern data storing means, so that a quantity of operating work by an operator can be reduced and erroneous setting by an operator can also be prevented.

With the numerical control apparatus according to another feature of the present invention, the acceleration/deceleration pattern data or the acceleration pattern data and the deceleration pattern data for a spindle motor comprise a time constant and a rotational speed of the spindle in each of a plurality of stages of an acceleration process as well as of a deceleration process, so that a spindle motor in the position loop control state can be controlled with acceleration/deceleration patterns similar to acceleration/deceleration patterns for the spindle motor in the velocity loop control state with a minimum number of data by means of setting stages with which a required effect can be obtained.

With the method of controlling acceleration/deceleration of a spindle motor of a numerical control apparatus according to the present invention, in a case where a method of making a slope of acceleration/deceleration (an acceleration) larger is used for making a cycle time required for tapping or the like shorter, the spindle motor in the position loop state control state is controlled with acceleration/deceleration patterns similar to acceleration/deceleration patterns of the spindle motor in the velocity loop control state, whereby response capability of a spindle motor is improved, and even in a case where inertia in the spindle becomes larger as compared to that in the servo axis, a follow-up delay of the spindle motor from the servo axis motor does not easily occur at a point of time just before start of acceleration from the stopped state or just before end of acceleration (for just before start of constant speed rotation), or at a point of time just before start of deceleration from constant speed rotation or just before end of deceleration (start of stopped state), so that a cycle time required for tapping or the like can be made shorter and processing precision can also be improved.

With the method of controlling acceleration/deceleration of a spindle motor of a numerical control apparatus according to another feature of the present invention, instructions for controlling a spindle motor in the position loop control state with acceleration/deceleration patterns similar to acceleration/deceleration patterns of the spindle motor in the velocity loop control state are computed with the spindle acceleration/deceleration control means according to the acceleration/deceleration pattern data stored in the spindle acceleration/deceleration pattern data storing means, and the spindle motor in the position loop control state is controlled with acceleration/deceleration patterns similar to acceleration/deceleration patterns of the spindle motor in the velocity loop control state, whereby response capability of a spindle motor is improved, and even in a case where inertia in the spindle becomes larger as compared to that in the servo axis, a follow-up delay of the spindle motor from the servo axis motor does not easily occur at a point of time just before start of acceleration from the stopped state or just before end of acceleration (for just before start of constant speed rotation), or at a point of time just before start of deceleration from constant speed rotation or just before end of deceleration (start of stopped state), so that a cycle time required for tapping or the like can be made shorter and processing precision can also be improved.

With the method of controlling acceleration/deceleration of a spindle motor of a numerical control apparatus according to another feature of the present invention, in a case where a method of making a slope of acceleration/deceleration (an acceleration) larger is used for making a cycle time required for tapping or the like shorter, acceleration/deceleration patterns similar to acceleration/deceleration patterns for the spindle motor in the velocity loop control state suitable for a material of a work, a material of a tool, and a form thereof can be selected, and the spindle motor in the position loop control state is controlled according to the selected spindle acceleration/deceleration pattern data, whereby response capability of the spindle motor is precisely improved, so that processing for instructing acceleration/deceleration optimal for processing conditions of a spindle as well as of a servo axis can be executed, and tapping precision can be improved.

With the method of controlling acceleration/deceleration of a spindle motor of a numerical control apparatus according to another feature of the present invention, selection of spindle acceleration/deceleration pattern data is instructed by describing a machining program, so that selection of spindle acceleration/deceleration pattern data can easily be instructed on a machining program.

With the method of controlling acceleration/deceleration of a spindle motor of a numerical control apparatus according to another feature of the present invention, in a case where a method of making a slope of acceleration/deceleration (an acceleration) larger is used for making a cycle time required for tapping shorter, acceleration/deceleration patterns similar to acceleration/deceleration patterns for the spindle motor in the different velocity loop control states each suitable for tap cutting operation as well as for tap pulling-off operation respectively are set for selection, and the spindle motor in the position loop control state is controlled according to the selected and set spindle acceleration/deceleration pattern data, so that response capability of the spindle motor is improved in an optimal state during the tap cutting operation as well as during the tap pulling-off operation, respectively, which makes it possible to execute optimal instructions for acceleration/deceleration for tap cutting operation and tap pulling-off operation of a spindle as well as of a servo axis, and to make a cycle time required for tapping shorter.

With the method of controlling acceleration/deceleration of a spindle motor of a numerical control apparatus according to another feature of the present invention, acceleration/deceleration patterns similar to acceleration/deceleration patterns for the spindle motor in the different velocity loop control states each suitable for acceleration as well as for deceleration respectively are set, and the spindle motor in the position loop control state is controlled according to the selected spindle acceleration pattern data or spindle deceleration pattern data, so that response capability of the spindle motor is improved in an optimal state during the tap cutting operation as well as during the tap pulling-off operation, respectively, and an optimal instruction for acceleration and an optimal instruction for deceleration for machine conditions of a spindle and a servo axis can be executed, whereby the spindle motor can be controlled with optimal acceleration patterns and deceleration patterns, so that it is possible not to generate a loss time in a cycle time even in a case where inertia in the spindle for acceleration is different from that in the spindle for deceleration.

With the method of controlling acceleration/deceleration of a spindle motor of a numerical control apparatus according to another feature of the present invention, a spindle motor in the velocity loop control state is rotated and driven from the stopped state and the spindle motor in the velocity loop control state is stopped from the constant speed rotation state, whereby the spindle acceleration/deceleration pattern data on the operations described above is automatically set in the spindle acceleration/deceleration pattern data storing section, so that a quantity of operating work by an operator can be reduced and erroneous setting by an operator can also be prevented.

With the method of controlling acceleration/deceleration of a spindle motor of a numerical control apparatus according to another feature of the present invention, the acceleration/deceleration pattern data, or the acceleration pattern data and deceleration pattern data for a spindle motor comprise a time constant and a rotational speed of the spindle in each of a plurality stages of an acceleration process as well as of a deceleration process, so that a spindle motor in the position loop control state can be controlled with acceleration/deceleration patterns similar to acceleration/deceleration patterns for the spindle motor in the velocity loop control state with a minimum number of data by means of setting stages with which a required effect can be obtained.

This application is based on Japanese patent application No. HEI 8-231798 filed in the Japanese Patent Office on Sep. 2, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A numerical control apparatus having a spindle control section for controlling a spindle motor and a servo axis control section for controlling a servo axis motor, said numerical control apparatus comprising:

a spindle acceleration/deceleration pattern data storing section for storing acceleration/deceleration pattern data for controlling the spindle motor in a position loop control state with acceleration/deceleration pattern data similar to acceleration/deceleration pattern data of the spindle motor in a velocity loop control state;

a spindle acceleration/deceleration control section for computing instructions for controlling the spindle motor in the position loop control state with the acceleration/deceleration pattern data similar to the acceleration/deceleration pattern data for the spindle motor in the velocity loop control state according to the acceleration/deceleration pattern data stored in said spindle acceleration/deceleration pattern data storing section; and a distributor for distributing instructions outputted from said spindle acceleration/deceleration control section so that synchronism between said spindle control section and said servo axis control section will be maintained.

2. The numerical control apparatus according to claim 1, wherein said spindle acceleration/deceleration pattern data storing section stores therein spindle acceleration pattern data for instructing acceleration and spindle deceleration pattern data for instructing deceleration and the spindle acceleration/deceleration control section computes instructions for controlling acceleration using acceleration pattern data or deceleration using deceleration pattern data, wherein the acceleration pattern data is different from the deceleration pattern data.

3. The numerical control apparatus according to claim 1, further comprising:

a spindle acceleration/deceleration data storing section for receiving acceleration data when the spindle motor in the velocity loop control state is rotated from a stopped state and deceleration data when the spindle motor in the velocity loop control state is stopped from a constant speed rotation state from said spindle control section and storing the received acceleration and deceleration data; and a spindle acceleration/deceleration data analyzing section for analyzing acceleration data and deceleration data stored in said spindle acceleration/deceleration data storing section, computing spindle acceleration pattern data and spindle deceleration pattern data for controlling the spindle motor in the position loop control state with acceleration pattern data or deceleration pattern data similar to acceleration/deceleration pattern data for the spindle motor in the velocity loop control state, and setting spindle acceleration pattern data and spindle deceleration pattern data in said spindle acceleration/deceleration pattern data storing section.

4. The numerical control apparatus according to claim 1, wherein said acceleration/deceleration pattern data stored in said spindle acceleration/deceleration data storing section comprises a time constant and a rotational speed of the spindle in each of a plurality of stages of an acceleration state as well as of a deceleration state.

5. A numerical control apparatus having a spindle control section for controlling a spindle motor and a servo axis control section for controlling a servo axis motor, said numerical control apparatus comprising:

a spindle acceleration/deceleration pattern data storing section for storing a plurality of types of acceleration/deceleration pattern data for controlling the spindle motor in a position loop control state with acceleration/deceleration pattern data similar to acceleration/deceleration pattern data of the spindle motor in a velocity loop control state;

a spindle acceleration/deceleration pattern data selecting section for selecting arbitrary acceleration/deceleration pattern data from said plurality of types of acceleration/deceleration pattern data stored in said spindle acceleration/deceleration pattern data storing section;

a spindle acceleration/deceleration control section for computing instructions for controlling the spindle motor in the position loop control state with the acceleration/deceleration pattern data similar to the acceleration/deceleration pattern data of the spindle motor in a speed loop control state according to the spindle acceleration/deceleration pattern data selected by said spindle acceleration/deceleration pattern data selecting section; and a distributor for distributing instructions outputted from said spindle acceleration/deceleration control section so that synchronism between said spindle control section and said servo axis control section will be maintained.

6. The numerical control apparatus according to claim 5, wherein said spindle acceleration/deceleration pattern data selecting section selects spindle acceleration/deceleration pattern data for a tap cutting operation instructed by a machining program and spindle acceleration/deceleration pattern data for a tap pulling-off operation also instructed by the machining program from said plurality of types of data stored in said spindle acceleration/deceleration pattern data storing section and the spindle acceleration/deceleration control section computes instructions for controlling with different acceleration/deceleration pattern data during the tap cutting operation and the tap pulling-off operation, respectively.

7. The numerical control apparatus according to claim 5, wherein setting for selection of said spindle acceleration/deceleration pattern data is executed by analyzing data described in a machining program.

8. The numerical control apparatus according to claim 5, wherein said spindle acceleration/deceleration pattern data storing section stores therein spindle acceleration pattern data for instructing acceleration and spindle deceleration pattern data for instructing deceleration and the spindle acceleration/deceleration control section computes instructions for controlling acceleration using acceleration pattern data or deceleration using deceleration pattern data, wherein the acceleration pattern data is different from the deceleration pattern data.

9. The numerical control apparatus according to claim 5, further comprising:

a spindle acceleration/deceleration data storing section for receiving acceleration data when the spindle motor in the velocity loop control state is rotated from a stopped state and deceleration data when the spindle motor in the velocity loop control state is stopped from a constant speed rotation state from said spindle control section and storing the received data; and a spindle acceleration/deceleration data analyzing section for analyzing acceleration data and deceleration data stored in said spindle acceleration/deceleration data storing section, computing spindle acceleration pattern data and spindle deceleration pattern data for controlling the spindle motor in the position loop control state with acceleration pattern data or deceleration pattern data similar to acceleration/deceleration pattern data for the spindle motor in the velocity loop control state, and storing spindle acceleration pattern data and spindle deceleration pattern data in said spindle acceleration/deceleration pattern data storing section.

10. The numerical control apparatus according to claim 5, wherein said acceleration/deceleration pattern data stored in said spindle acceleration/deceleration data storing section comprises a time constant and a rotational speed of the spindle in each of a plurality of stages of an acceleration step as well as of a deceleration step.

11. A method of controlling acceleration/deceleration of a spindle motor of a numerical control apparatus having a spindle control section for controlling the spindle motor and a servo axis control section for controlling a servo axis motor, said method comprising the following steps:

storing in a spindle acceleration/deceleration pattern data storing section acceleration/deceleration pattern data for controlling the spindle motor in a position loon control state with acceleration/deceleration pattern data similar to acceleration/deceleration pattern data of the spindle motor in a velocity loop control state;

computing with a spindle acceleration/deceleration control section instruction for controlling the spindle motor in the position loop control state with the acceleration/deceleration pattern data similar to the acceleration/deceleration pattern data of the spindle motor in the velocity loop control state according to the acceleration/deceleration pattern data stored in the spindle acceleration/deceleration pattern data storing section;

controlling the spindle motor in a position loop control state with acceleration/deceleration pattern data similar to acceleration/deceleration pattern data of the spindle motor in a velocity loop control state; and distributing instructions outputted from the spindle acceleration/deceleration control section with the distributor so that the synchronism between said spindle control section and said servo axis control section is maintained.

12. The method of controlling acceleration/deceleration of a spindle motor of a numerical control apparatus according to claim 11, further comprising a step of instructing selection of the spindle acceleration/deceleration pattern data by describing a machining program.

13. The method of controlling acceleration/deceleration of a spindle motor of a numerical control apparatus according to claim 11, further comprising the following steps:

discretely instructing selection of the spindle acceleration/deceleration pattern data with a machining program during a tap cutting operation and during a tap pulling-off operation; and controlling acceleration/deceleration of the spindle motor with different acceleration/deceleration pattern data during the tap cutting operation and during the tap pulling-off operation respectively.

14. The method of controlling acceleration/deceleration of a spindle motor of a numeral control device according to claim 11, further comprising the following steps:

storing a plurality of types of acceleration/deceleration pattern data in said spindle acceleration/deceleration pattern data storing section;

computing with the spindle acceleration/deceleration control section instructions for controlling the spindle motor in the position loop control state with the acceleration/deceleration pattern data similar to the acceleration/deceleration pattern data of the spindle motor in the velocity loop control state according to the type of acceleration/deceleration pattern data selected by the spindle acceleration/deceleration pattern data selecting section.

15. The method of controlling acceleration/deceleration of a spindle motor of a numerical control apparatus according to claim 14, further comprising a step of instructing selection of the spindle acceleration/deceleration pattern data by describing a machining program.

16. The method of controlling acceleration/deceleration of a spindle motor of a numerical control apparatus according to claim 14, further comprising the following steps:

discretely instructing selection of the spindle acceleration/deceleration pattern data with a machining program during a tap cutting operation and during a tap pulling-off operation; and controlling acceleration/deceleration of the spindle motor with different acceleration/deceleration pattern data during the tap cutting operation and during the tap pulling-off operation, respectively.

17. The method of controlling acceleration/deceleration of a spindle motor of a numerical control apparatus according to claim 11, further comprising a step of controlling the spindle motor using acceleration pattern data during acceleration of the spindle or deceleration of the spindle motor using deceleration pattern data during deceleration of the spindle, wherein the acceleration pattern data is different from the deceleration pattern data.

18. The method of controlling acceleration/deceleration of a spindle motor of a numerical control apparatus according to claim 11, further comprising a step of setting data for controlling the spindle motor in the position loop control state with the acceleration/deceleration pattern data similar to the acceleration/deceleration pattern data of the spindle motor in the velocity loop control state according to the acceleration characteristics obtained when the spindle motor is actually accelerated/decelerated in the velocity loop control state.

19. The method of controlling acceleration/deceleration of a spindle motor of a numerical control apparatus according to claim 11, further comprising a step of composing acceleration/deceleration pattern data for the spindle motor with a time constant and a rotational speed of the spindle in each of a plurality of stages of an acceleration process as well as of a deceleration process.

* * * * *